(12) United States Patent
Yao et al.

(10) Patent No.: US 12,443,082 B2
(45) Date of Patent: Oct. 14, 2025

(54) DISPLAY SUBSTRATE, DISPLAY DEVICE AND MOTHERBOARD

(71) Applicants: Ordos Yuansheng Optoelectronics Co., Ltd., Inner Mongolia (CN); BOE Technology Group Co., Ltd., Beijing (CN)

(72) Inventors: Lei Yao, Beijing (CN); Feng Li, Beijing (CN); Kai Li, Beijing (CN); Haidong Su, Beijing (CN); Chenglong Wang, Beijing (CN); Lin Hou, Beijing (CN); Haoyi Xin, Beijing (CN)

(73) Assignees: Ordos Yuansheng Optoelectronics Co., Ltd., Inner Mongolia (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/702,386

(22) PCT Filed: Oct. 25, 2022

(86) PCT No.: PCT/CN2022/127461
§ 371 (c)(1),
(2) Date: Apr. 18, 2024

(87) PCT Pub. No.: WO2024/087031
PCT Pub. Date: May 2, 2024

(65) Prior Publication Data
US 2025/0258412 A1    Aug. 14, 2025

(51) Int. Cl.
*G02F 1/1362* (2006.01)
*G02F 1/1368* (2006.01)

(52) U.S. Cl.
CPC .. *G02F 1/136286* (2013.01); *G02F 1/136209* (2013.01); *G02F 1/136227* (2013.01); *G02F 1/1368* (2013.01)

(58) Field of Classification Search
CPC .............. G02F 1/136209; G02F 1/136286
(Continued)

(56) References Cited

U.S. PATENT DOCUMENTS

| 2014/0008656 A1 | 1/2014 | Shim et al. |
| 2016/0013250 A1 | 1/2016 | Kim et al. |

(Continued)

FOREIGN PATENT DOCUMENTS

| CN | 104834139 A | 8/2015 |
| CN | 106855670 A | 6/2017 |

(Continued)

OTHER PUBLICATIONS

Extended European Search Report, mailed Jun. 30, 2025, from European Patent Application No. 22963018.1, 11 pages.

*Primary Examiner* — Christopher M Raabe
(74) *Attorney, Agent, or Firm* — Workman Nydegger

(57) ABSTRACT

The display substrate, display device and motherboard provided in the present disclosure include a first base substrate, a plurality of first signal lines, a plurality of second signal lines, and a plurality of pixel electrodes, and the orthographic projection of the pixel electrodes on the first base substrate is within the orthographic projection of the area defined by the intersection of each first signal line and each second signal line; first light-shielding structures are located above the layer where the pixel electrodes are located, each first light-shielding structure extends in the second direction and is arranged along the first direction, the orthographic projections of the first light-shielding structures on the substrate of the first substrate is within the orthographic projection of gaps between the columns of pixel electrodes extending in the second direction, and has an area that does not overlap with the orthographic projection of the second signal line.

20 Claims, 19 Drawing Sheets

(58) Field of Classification Search
USPC .......................................................... 349/33
See application file for complete search history.

(56) References Cited

U.S. PATENT DOCUMENTS

| | | | |
|---|---|---|---|
| 2016/0320650 A1 | 11/2016 | Ding et al. | |
| 2021/0358857 A1 | 11/2021 | Liu | |
| 2022/0365396 A1* | 11/2022 | Qian | H10D 86/60 |
| 2025/0035975 A1* | 1/2025 | Miao | G02F 1/133514 |
| 2025/0035997 A1* | 1/2025 | Yao | G02F 1/136295 |

FOREIGN PATENT DOCUMENTS

| | | |
|---|---|---|
| CN | 108646481 A | 10/2018 |
| CN | 109270720 A | 1/2019 |
| CN | 111103734 A | 5/2020 |

\* cited by examiner

DISPLAY SUBSTRATE, DISPLAY DEVICE AND MOTHERBOARD

CROSS-REFERENCE TO RELATED APPLICATIONS

The application is a National Stage of International Application No. PCT/CN2022/127461, filed Oct. 25, 2022, which is hereby incorporated by reference in its entirety.

TECHNICAL FIELD

The present disclosure relates to the field of display technology, in particular to a display substrate, a display device and a motherboard.

BACKGROUND

Liquid crystal display (LCD) has the advantages of light weight, low power consumption, high image quality, low radiation and easy portability, and has gradually replaced the traditional cathode ray tube display (CRT), and is widely used in modern information equipment, such as virtual reality (VR) head-mounted display devices, notebook computers, TVs, mobile phones and digital products.

SUMMARY

The display substrate, display device and mother board provided in the embodiment of the present disclosure, the specific scheme is as follows.

On the one hand, embodiments of the present disclosure provide a display substrate, including:
 a first base substrate;
 a plurality of first signal lines on a side of the first base substrate, where the plurality of first signal lines extend along a first direction and are arranged along a second direction, and the first direction and the second direction intersect with each other;
 a plurality of second signal lines on the same side of the first base substrate as the plurality of first signal lines, where the plurality of second signal lines and the plurality of first signal lines are arranged in different layers, and the plurality of second signal lines extend along the second direction and are arranged along the first direction;
 a plurality of pixel electrodes on a side, facing away from the first base substrate, of layers where the plurality of first signal lines and the plurality of second signal lines are located, where orthographic projections of the plurality of pixel electrodes on the first base substrate are within areas defined by intersections of orthographic projections of the plurality of first signal lines on the first base substrate and orthotropic projections of the plurality of second signal lines on the first base substrate;
 a plurality of first light-shielding structures on a side, facing away from the first base substrate, of a layer where the plurality of pixel electrodes are located, where the plurality of first light-shielding structures extend along the second direction and are arranged along the first direction, orthographic projections of the plurality of first light-shielding structures on the first base substrate are within orthographic projection of a gaps between columns of pixel electrodes extending in the second direction on the first base substrate, the orthographic projections of the plurality of first light-shielding structures on the first base substrate and the orthographic projections of the plurality of second signal lines on the first base substrate have areas that do not overlap with each other.

In some embodiments, in the display substrate provided by the present disclosure, the orthographic projections of the plurality of second signal lines on the first base substrate are within the orthographic projections of the plurality of first light-shielding structures on the first base substrate.

In some embodiments, the display substrate provided by the present disclosure, further includes: a plurality of second light-shielding structures arranged between the layers where the plurality of first signal lines and the plurality of second signal lines are located and the first base substrate;
 where the plurality of second light-shielding structures extend along the first direction and are arranged along the second direction; and
 the orthographic projections of the plurality of first signal lines on the first base substrate is within orthographic projections of the plurality of second light-shielding structures on the first base substrate.

In some embodiments, in the display substrate provided by the present disclosure, an orthographic projection of one first signal line on the first base substrate is on a side of an orthographic projection of a symmetry axis extending along the first direction of one second light-shielding structure;
 on the same side of the symmetry axis extending along the first direction of the one second light-shielding structure, a distance by which the orthographic projection of the plurality of second light-shielding structures on the first base substrate extends outward relative to the orthographic projection of the plurality of first signal lines on the first base substrate is greater than 0 μm and less than or equal to 0.4 μm.

In some embodiments, the display substrate provided by the present disclosure, a plurality of transistors between the first base substrate and the layer where the plurality of pixel electrodes are located, and a planarization layer between the layer where the plurality of transistors are located and the layer where the plurality of pixel electrodes are located; where a first electrode of each transistor is electrically connected with each pixel electrode by means of a first through hole penetrating through the planarization layer;
 an orthographic projection of the first through hole on the first base substrate is within the orthographic projections of the plurality of second light-shielding structures on the first base substrate.

In some embodiments, in the display substrate provided by the present disclosure, an orthographic projection of a symmetry axis extending along the first direction, of the plurality of second light-shielding structures on the first base substrate roughly coincides with an orthographic projection of a symmetry axis extending along the first direction, of the first through hole on the first base substrate.

In some embodiments, in the display substrate provided by the present disclosure, on the same side of the symmetry axis extending along the first direction, of the plurality of second light-shielding structures, and in a direction where the plurality of second light-shielding structures is facing away from the first base substrate, an aperture of the first through hole gradually increases; and
 the orthographic projection of the plurality of second light-shielding structures on the first base substrate extends outward by a distance greater than or equal to 0.8 μm and less than or equal to 1.0 μm relative to an orthographic projection of a maximum aperture of the first through hole on the first base substrate.

In some embodiments, in the display substrate provided by the present disclosure, a thickness of the planarization layer in a direction perpendicular to the first base substrate is greater than or equal to 1.2 μm and less than or equal to 1.8 μm.

In some embodiments, the display substrate provided by the present disclosure, further includes a gate insulating layer, a first interlayer dielectric layer and a second interlayer dielectric layer which are between the layer where the first electrode of each transistor is located and the layer where an active layer of each transistor is located;

where the first electrode of each transistor is electrically connected with the active layer of each transistor by means of a second through hole penetrating through the second interlayer dielectric layer, the first interlayer dielectric layer and the gate insulating layer; and an orthographic projection of the second through hole on the first base substrate is within an orthographic projection of one second light-shielding structure on the first base substrate.

In some embodiments, in the display substrate provided by the present disclosure, the orthographic projection of the first signal line on the first base substrate and the orthographic projection of the second through hole on the first base substrate are respectively on both sides of the symmetry axis extending along the first direction, of the second light-shielding structure; in a direction that the plurality of second light-shielding structures are facing away from the first base substrate, an aperture of the second through hole gradually increases;

in the second direction, a distance between the orthographic projection of the first signal line on the first base substrate and an orthographic projection of a maximum aperture of the second through hole on the first base substrate is approximately equal to a+ $\sqrt{2b^2+c^2}$, where a is a length of a light doping region of the active layer in each transistor in the second direction, b is ½ of a process fluctuation value of the first signal line and the second through hole, and c is an alignment deviation of the first signal line and the second through hole.

In some embodiments, in the display substrate provided by the present disclosure, on the same side of the symmetry axis extending along the first direction, of the second light-shielding structure, a distance by which the orthographic projection of the plurality of second light-shielding structures on the first base substrate extends outward relative to an orthographic projection of a maximum aperture of the second through hole is greater than or equal to 0.5 μm and less than 0.9 μm.

In some embodiments, in the display substrate provided by the present disclosure, an orthographic projection of the first electrode of each transistor on the first base substrate is within the orthographic projection of the plurality of second light-shielding structures on the first base substrate.

In some embodiments, the display substrate provided by the present disclosure, further includes a common electrode on a side, facing away from the first base substrate, of the layer where the plurality of pixel electrodes are located, where the plurality of first light-shielding structures are in contact with the common electrode.

In some embodiments, in the display substrate provided by the present disclosure, the plurality of first light-shielding structures are on a side facing the first base substrate, of the common electrode;

the orthographic projection of the plurality of first light-shielding structures on the first base substrate is within the orthographic projection of the common electrode on the first base substrate, and the common electrode cover a lateral surface of the plurality of first light-shielding structures.

In some embodiments, in the display substrate provided by the present disclosure, the plurality of first light-shielding structures are on a side facing away from the first base substrate, of the common electrode;

at gaps between columns of pixel electrodes extending in the second direction, the orthographic projection of the plurality of first light-shielding structures on the first base substrate roughly coincides with the orthographic projection of the common electrode on the first base substrate.

In some embodiments, in the display substrate provided by the present disclosure, the common electrode includes a plurality of slits extending along the second direction, each pixel electrode is correspondingly arranged with at least one slit, and orthotropic projections of the plurality of slits on the first base substrate and the orthotropic projections of the plurality of first light-shielding structures on the first base substrate do not overlap with each other.

On another aspect, some embodiments of the present disclosure provide a display device, including a display substrate and an opposing substrate placed oppositely, and a liquid crystal layer arranged between the display substrate and the opposing substrate, where the display substrate is the display substrate as aforementioned in the embodiments of the present disclosure.

In some embodiments, in the display device provided by the present disclosure, the opposing substrate includes a black matrix, the black matrix includes a plurality of first black matrices extending in the second direction and arranged in the first direction, and the orthographic projections of the plurality of first light-shielding structures on the first base substrate are within orthographic projections of the plurality of first black matrixes on the first base substrate.

In some embodiments, in the display device provided by the present disclosure, the opposing substrate includes a black matrix, the black matrix includes a plurality of second black matrices extending in the first direction and arranged in the second direction, and orthographic projections of the plurality of second black matrixes on the first base substrate are within the orthographic projections of the plurality of second light-shielding structures on the first base substrate;

in a direction that the plurality of second light-shielding structures are facing away from the first base substrate, an aperture of the first through hole penetrating through the planarization layer gradually increases, and a width of each second black matrix in the second direction is greater than or equal to a minimum aperture of the first through hole in the second direction and less than a maximum aperture of the first through hole in the second direction.

In some embodiments, in the display device provided by the present disclosure, an orthographic projection of a symmetry axis extending along the first direction, of the plurality of second black matrixes on the first base substrate and an orthographic projection of a symmetry axis extending along the first direction of, the plurality of second light-shielding structures on the first base substrate roughly coincides.

On another aspect, some embodiments of the present disclosure provide a motherboard, including a plurality of display substrates as aforementioned in the embodiments of the present disclosure, and the first base substrate of each display substrate forms a base substrate of an integrated structure.

In some embodiments, in the motherboard provided by the present disclosure, each display substrate includes a display area and a bezel area on at least one side of the display area; the motherboard further includes a plurality of first alignment marks, where the plurality of first alignment marks are in the bezel area and/or at gaps between adjacent display substrates;

each first alignment mark includes a first sub-alignment pattern arranged in a same layer and material as the plurality of first signal lines, a second sub-alignment pattern arranged in a same layer and material as the plurality of second signal lines, and a third sub-alignment pattern arranged in a same layer and material as the second interlayer dielectric layer;

where the first sub-alignment pattern includes a first hollow structure, and an orthographic projection of the second sub-alignment pattern on the base substrate is within an orthographic projection of the first hollow structure on the base substrate, an orthographic projection of the third sub-alignment pattern on the base substrate is within the orthographic projection of the second sub-alignment pattern on the base substrate.

In some embodiments, the motherboard provided by the present disclosure, further includes a plurality of second alignment marks, where the plurality of second alignment marks are in the bezel area, and/or at the gaps of between adjacent display substrates;

each second alignment mark includes a fourth sub-alignment pattern arranged in a same layer and material as the plurality of second signal lines, and a fifth sub-alignment pattern arranged in a same layer and material as the plurality of first light-shielding structures;

where an orthographic projection of the fifth sub-alignment pattern on the base substrate is within an orthographic projection of the fourth sub-alignment pattern on the base substrate.

In some embodiments, in the motherboard provided by the present disclosure, insulating layers on a side facing the layer where the plurality of first light-shielding structures are located, of the layer where the plurality of second signal lines are locate, are successively arranged as: a second interlayer dielectric layer, a planarization layer and a passivation layer; the passivation layer and the second interlayer dielectric layer are merely arranged between the fourth sub-alignment pattern and the fifth sub-alignment pattern.

In some embodiments, the motherboard provided by the present disclosure, further includes a plurality of opposing substrates placed opposite to the plurality of display substrates, where second base substrates of the plurality of opposing substrates are integrally arranged, and each opposing substrate includes a black matrix;

the motherboard further includes a plurality of third alignment marks, where the plurality of third alignment marks are in the bezel area and/or at gaps between adjacent opposing substrates;

each third counterpoint marker includes a sixth sub-alignment pattern arranged in a same layer and material as the black matrix, and a seventh sub-alignment pattern arranged in a same layer and material as the plurality of first light-shielding structures;

the seventh sub-alignment pattern includes a second hollow structure, and an orthographic projection of the sixth sub-alignment pattern on the base substrate is within an orthographic projection of the second hollow structure on the base substrate.

In some embodiments, the motherboard provided by the present disclosure, further includes a plurality of fourth alignment marks, where the plurality of fourth alignment marks are roughly evenly distributed at the gaps between the display substrates, the plurality of fourth alignment marks are arranged in a same layer and material as the plurality of first light-shielding structures, and the fourth alignment marks are configured to measure a deviation of an actual position of the seventh sub-alignment pattern from a preset position.

DETAILED DESCRIPTION

Figure 1:
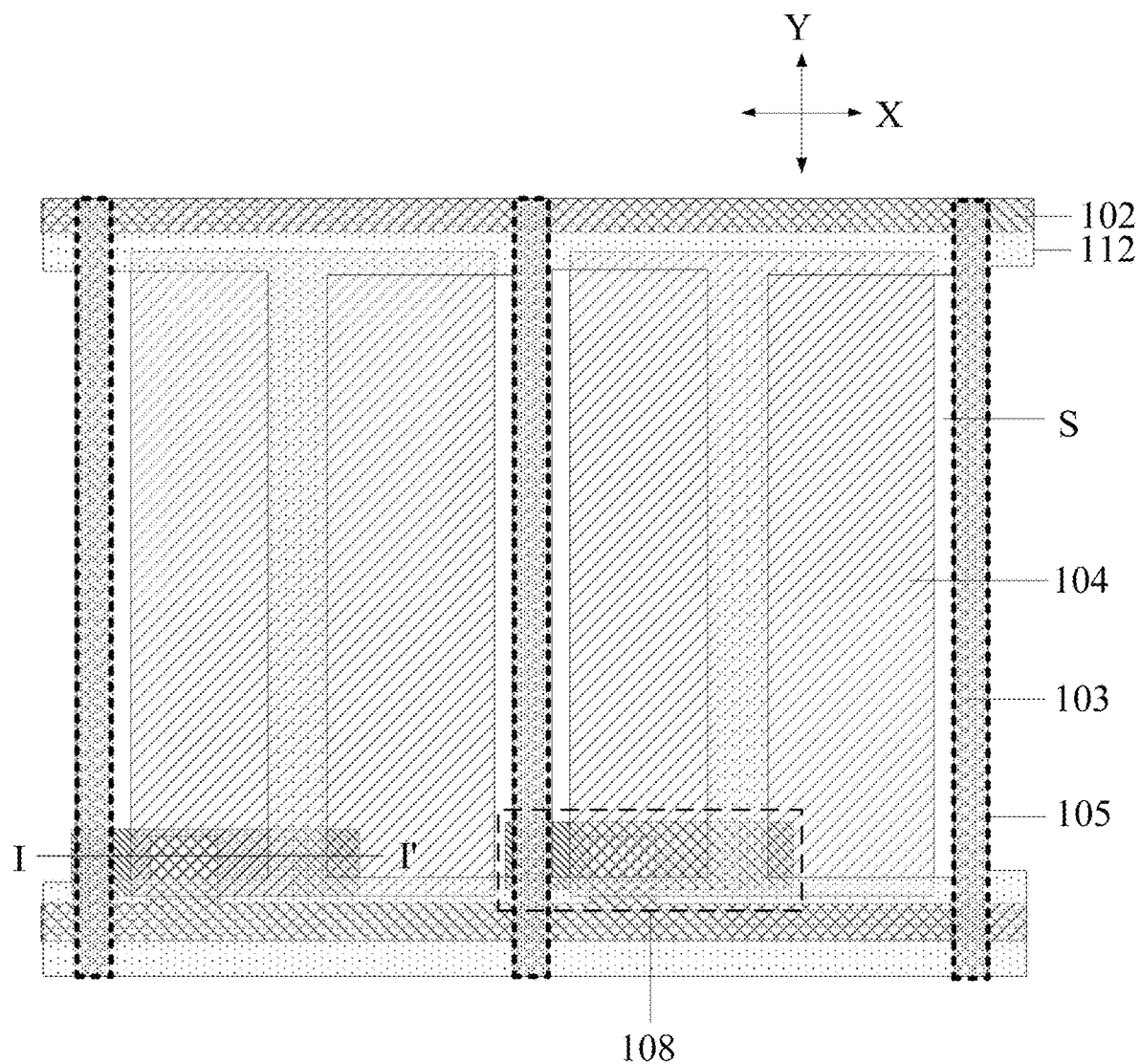
FIG. 1 is a structural schematic diagram of the display substrate provided by an embodiment of the present disclosure.

In order to make the purpose, technical solution and advantages of embodiments of the present disclosure clearer, the technical solutions of embodiments of the present disclosure will be clearly and completely described below in conjunction with the accompanying drawings of embodiments of the present disclosure. It should be noted that the dimensions and shapes of the figures in the drawings do not reflect the true proportions, and are intended to illustrate the contents of this disclosure, and the same or similar designation at all times indicates the same or similar element or component with the same or similar function. In order to keep the following descriptions of embodiments of the present disclosure clear and concise, the detailed descriptions of known functions and known parts are omitted.

Unless otherwise defined, the technical or scientific terms used herein shall have the meaning normally understood by persons with general skill in the field to which the disclosure belongs. The use of the words "first", "second" and similar terms in this disclosure statement and in the claims does not indicate any order, quantity or importance, but merely serves to distinguish the different components. Words such as "include" or "comprise" mean that the element or object preceding the word includes the element or object listed after the word and its equivalents, and does not exclude other elements or objects. "Inside", "Outside", "Up", "Down", etc., are only used to indicate a relative positional relationship, and when the absolute position of the described object changes, the relative positional relationship may also change accordingly.

In recent years, with the diversification and expansion of VR application fields, the demand for VR products has grown rapidly. Most of the high-resolution VR products in related art use liquid crystal display panels. In order to improve the immersive experience and reduce the screen door effect in use, the resolution (PPI) of VR products continues to increase, and while the resolution continues to increase, the pixel pitch is also constantly compressed, and correspondingly, the size of the black matrix is also compressed. Affected by the process capability of the alignment equipment, when there is an alignment deviation between the display substrate and the opposing substrate, the black matrix cannot effectively block the light leakage at the pixel pitch, resulting in color crossing, affecting the display effect and user experience.

In order to improve the above-mentioned technical problems existing in the related art, the embodiment of the present disclosure provides a display substrate, as shown in FIGS. 1 to 4, including:
- a first base substrate 101;
- a plurality of first signal lines 102 on a side of the first base substrate 101; the plurality of first signal lines 102 extend along the first direction X and are arranged along the second direction Y, and the first direction X and the second direction Y intersect;
- a plurality of second signal lines 103 arranged on the same side of the first base substrate 101 as the first signal lines 102, and the second signal lines 103 and the first signal lines 102 are in different layers, and the second signal lines 103 extend along the second direction Y and are arranged along the first direction X;
- a plurality of pixel electrodes 104 on a side, facing away from the first base substrate 101, of layers where the plurality of first signal lines 102 and the plurality of second signal lines 103 are located; and the orthographic projection of the pixel electrodes 104 on the first base substrate 101 is with an area defined by the intersection of the orthotropic projection of the first signal lines 102 on the first base substrate 101 and the orthotropic projection of the second signal lines 103 on the first base substrate 101;
- a plurality of first light-shielding structures 105 on a side facing away from the first base substrate 101, of a layer where the pixel electrodes 104 are located, the first light-shielding structures 105 extend along the second direction Y and are arranged along the first direction X, the orthographic projection of the first light-shielding structures 105 on the first base substrate 101 is within the orthographic projection of the gap between the columns of pixel electrodes 104 extending in the second direction Y on the first base substrate 101, and the orthographic projection of the first light-shielding structures 105 on the first base substrate 101 and the orthographic projection of the second signal lines 103 on the first base substrate 101 have areas that do not overlap with each other.

In the display substrate provided in embodiments of the present disclosure, by providing the first light-shielding structures 105, and arranging the orthographic projection of the first light-shielding structures 105 on the first base substrate 101 and the orthographic projection of the second signal lines 103 on the first base substrate 101 have areas that do not overlap with each other, so as to shade through the first light-shielding structures 105 together with the second signal lines 103 on the display substrate along the second direction Y, reduce the risk of light leakage at the gap between the pixel electrodes 104 extending in the second direction Y, improve the poor color crossing, improve the display effect, and improve the user experience.

For high-resolution display products, the pixel pitch extending in the direction of the data line is usually small, and the width of the black matrix extending in the direction of the data line is correspondingly small. When there is an alignment deviation between the display substrate and the opposing substrate, the black matrix extending in the direction of the data line cannot effectively block the light leakage at the gap between pixels extending in the direction of the data line, and the color crossover phenomenon is prone to occur. Based on this, in the present disclosure, the first signal line 102 can be a gate line, and the second signal line 103 can be a data line, so that when the alignment deviation occurs between the opposing substrate and the display substrate, the first light-shielding structure 105, the data line and the black matrix can jointly block the light leakage at the gap between pixels extending on the second direction Y, and effectively improve the color crossover defect caused by the alignment deviation in the related art that adopts the black matrix shading alone. It should be noted that, in order to facilitate understanding, the technical scheme of the present disclosure is introduced below with the first signal line 102 as a gate line and the second signal line 103 as a data line.

Figure 3:
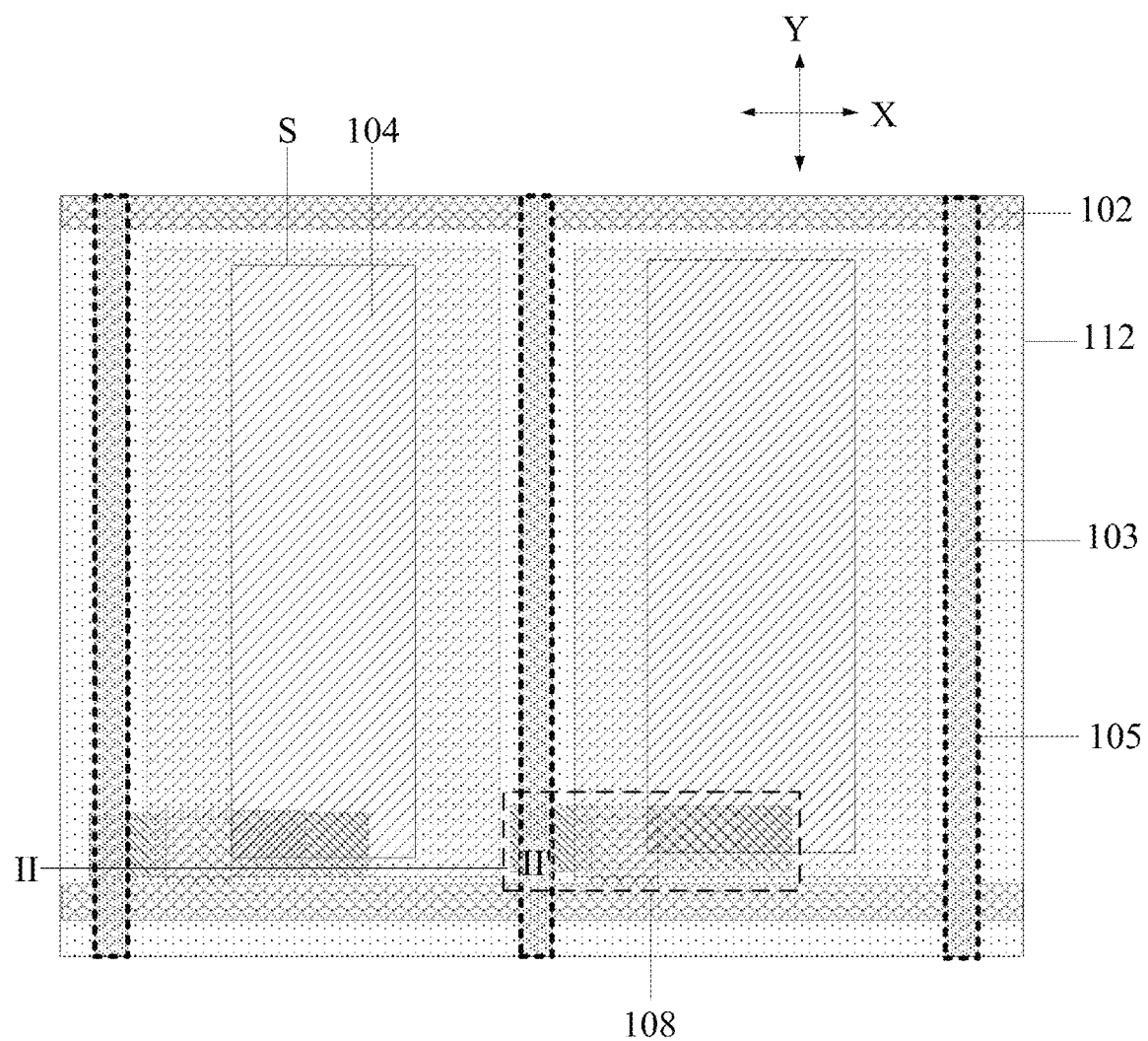
FIG. 3 is another structural schematic diagram of the display substrate provided by an embodiment of the present disclosure.

In some embodiments, in the display substrate provided in the present embodiment, as shown in FIG. 1 and FIG. 3, the orthographic projection of the second signal lines 103 on the first base substrate 101 may be within the orthographic projection of the first light-shielding structures 105 on the first base substrate 101, and in this case, in the second direction Y, the first light-shielding structure 105 actually plays a shading role. Compared with that the orthographic projection of the first light-shielding structures 105 on the first base substrate 101 and the orthographic projection of the second signal lines 103 on the first base substrate 101 that do not overlap with each other, the scheme of the first light-shielding structures 105 and the second signal lines 102 coordinating shading is required, and in the scheme of separately using the first light-shielding structures 105 covering the second signal lines 102 for shading, the line width of the first light-shielding structures 105 is larger and conducive to make, and there is also no need to consider the synergistic shading effect between the first light-shielding structures 105 and the second signal lines 102, which is conducive to simple design.

In related VR products, in the gate line direction (e.g., the first direction X), the gate line of the display substrate is shaded by the black matrix of the opposite substrate, so the actual shading layer in the gate line direction (e.g., the first direction X) is a black matrix. The size (CD) design of the black matrix directly affects the transmittance and opening rate of the pixels. In the actual design and process, it is required that the alignment level between the display substrate and the opposing substrate must be within a certain design range, and then in the gate line direction (such as the first direction X), the optical performance instability caused by the difference in the opening rate and transmittance caused by the alignment error of the gate line and the black matrix should be minimized. Specifically, affected by the process capability of the LCD box alignment equipment, when the alignment between the display substrate and the opposing substrate fluctuates, the black matrix may not be able to effectively shade the gate line, resulting in an increase in the shading area, insufficient product opening rate, insufficient transmittance, and uneven brightness.

Figure 5:
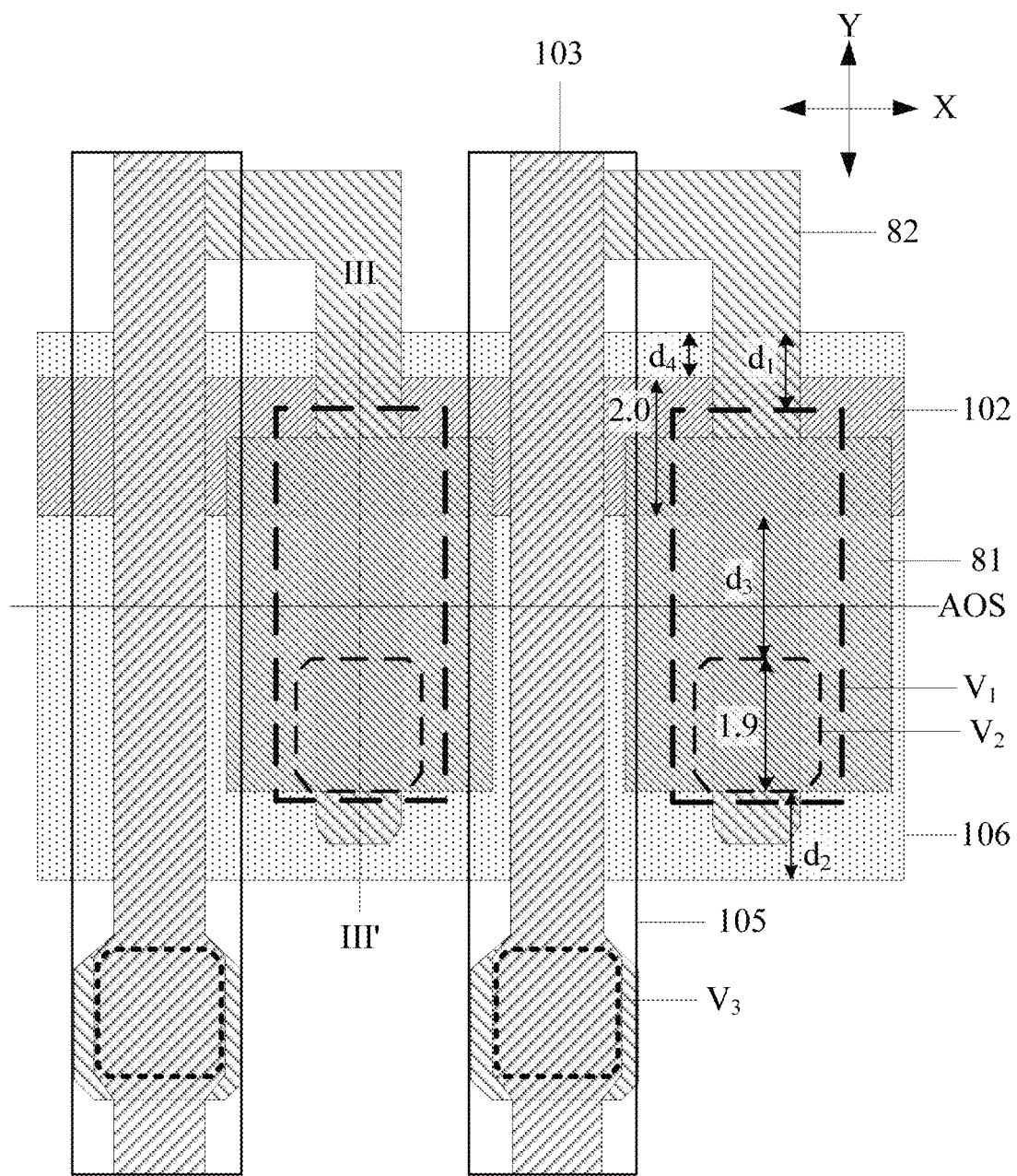
FIG. 5 is another structural schematic diagram of the display substrate provided by an embodiment of the present disclosure.
Figure 6:
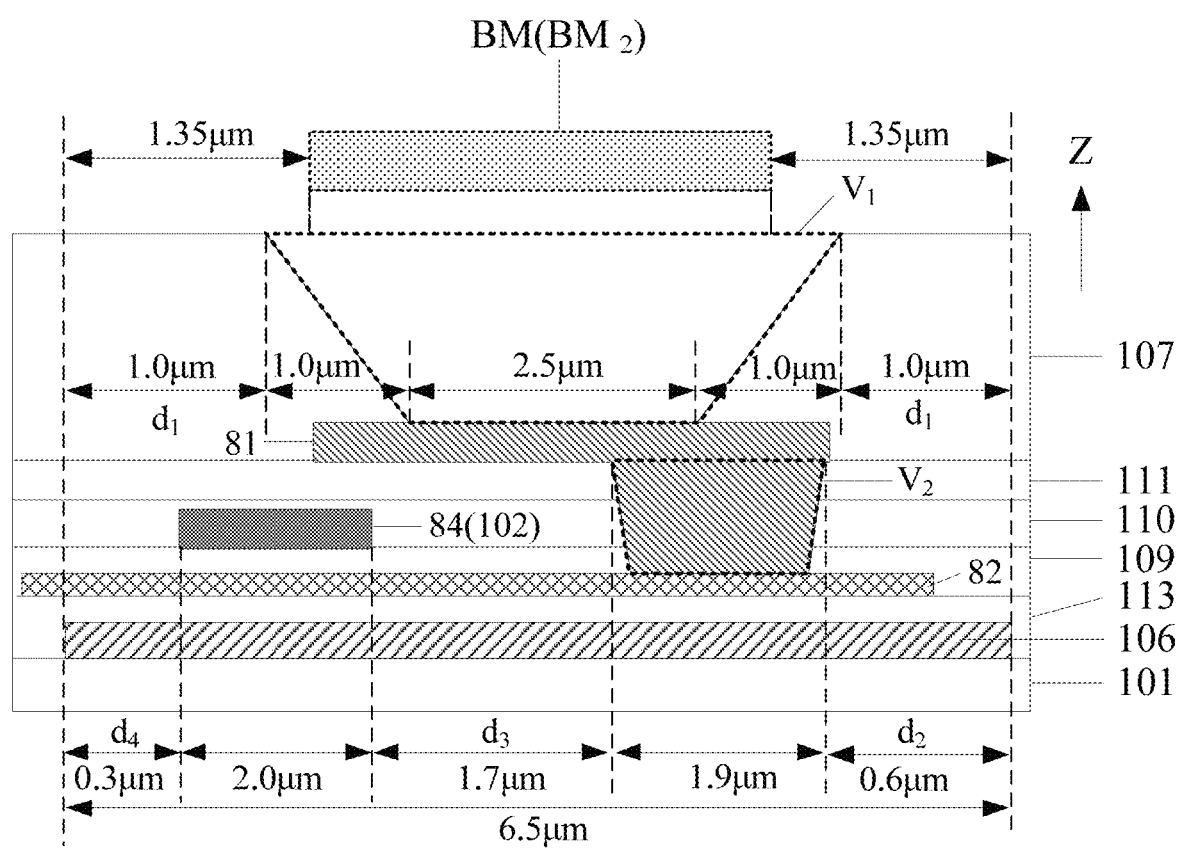
FIG. 6 is a cross-sectional view along the line III-III' in FIG. 5.

Based on this, in order to improve the opening rate and transmittance on the gate line direction (such as the first direction X), as shown in FIG. 5 and FIG. 6, in the above-mentioned display substrate provided in the embodiment of the present disclosure, a plurality of second light-shielding structures 106 extending along the first direction X (equivalent to the gate line direction) and arranging along the second direction Y (equivalent to the data line direction) may be arranged between the layers where the plurality of first signal lines 102 and the plurality of second signal lines 103 are located and the first base substrate 101. The orthographic projection of the first signal lines 102 on the first base substrate 101 is within the orthographic projection of the second light-shielding structures 106 on the first base substrate 101, that is, the actual shading layer on the first direction X (equivalent to the gate line direction) is changed from the black matrix BM of the opposite substrate to the second light-shielding structures 106 on the display substrate. Compared with the large alignment fluctuation (+1.5 μm) between the display substrate and the opposing substrate, the direct alignment between the layers on the display substrate of the related art can be accurately controlled to be within +0.8 μm. Therefore, when the actual shading layer on the first direction X (equivalent to the gate line direction) is replaced by the second light-shielding structure 106, the opening rate and transmittance can be effectively improved.

Figure 2:
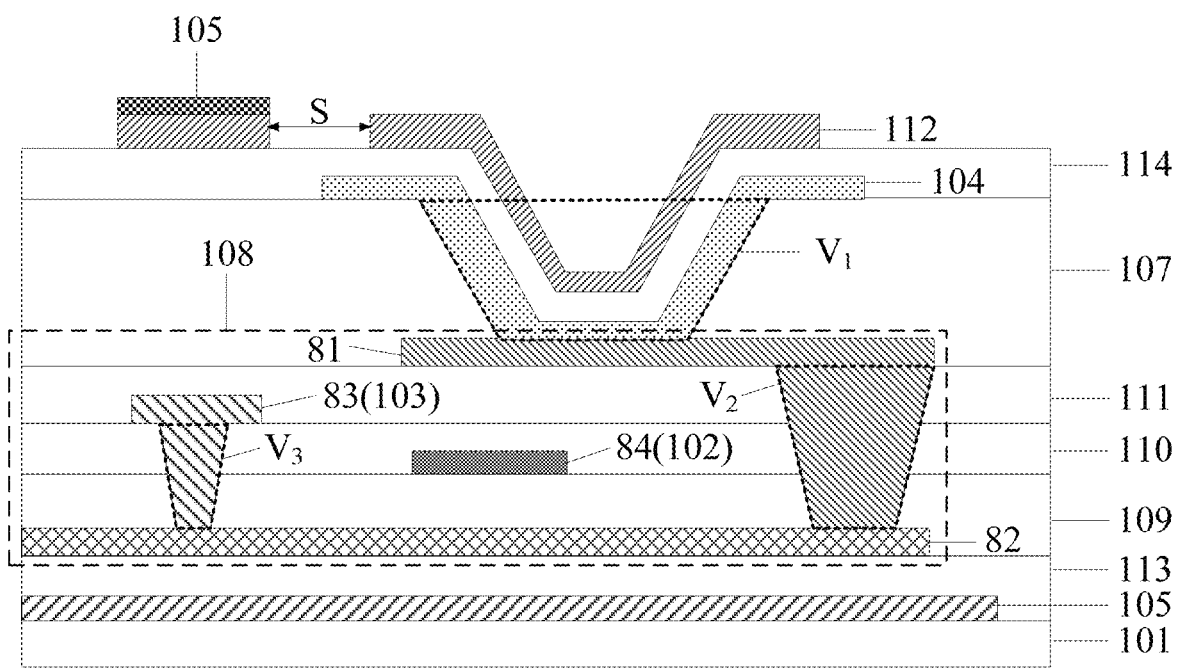
FIG. 2 is a cross-sectional view along the line I-I' in FIG. 1.
Figure 4:
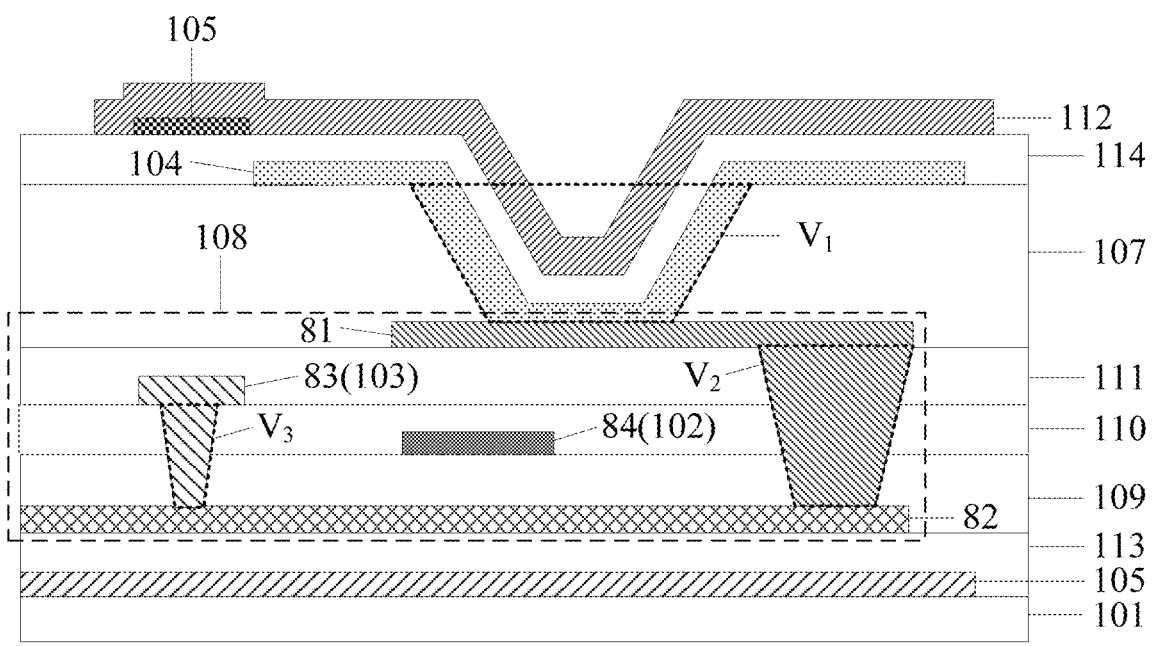
FIG. 4 is a cross-sectional view along the line II-II' in FIG. 3.

In some embodiments, in the display substrate provided in the present embodiments, as shown in FIG. 2 and FIG. 4, there is a planarization layer 107 between the first base substrate 101 and the layer where the pixel electrodes 104 are. A plurality of transistors 108 are provided between the planarization layer 107 and the first base substrate 101. The first electrode 81 of the transistor 108 is electrically connected with the pixel electrode 104 through the first through hole $V_1$ penetrating the planarization layer 107. In some embodiments, as shown in FIG. 5 and FIG. 6, the orthographic projection of the first through hole $V_1$ on the first base substrate 101 is within the orthographic projection of the second light-shielding structure 106 on the first base substrate 101 to completely shade the first through hole $V_1$ through the second light-shielding structure 106 to avoid light leakage at the first through hole $V_1$.

Figure 7:
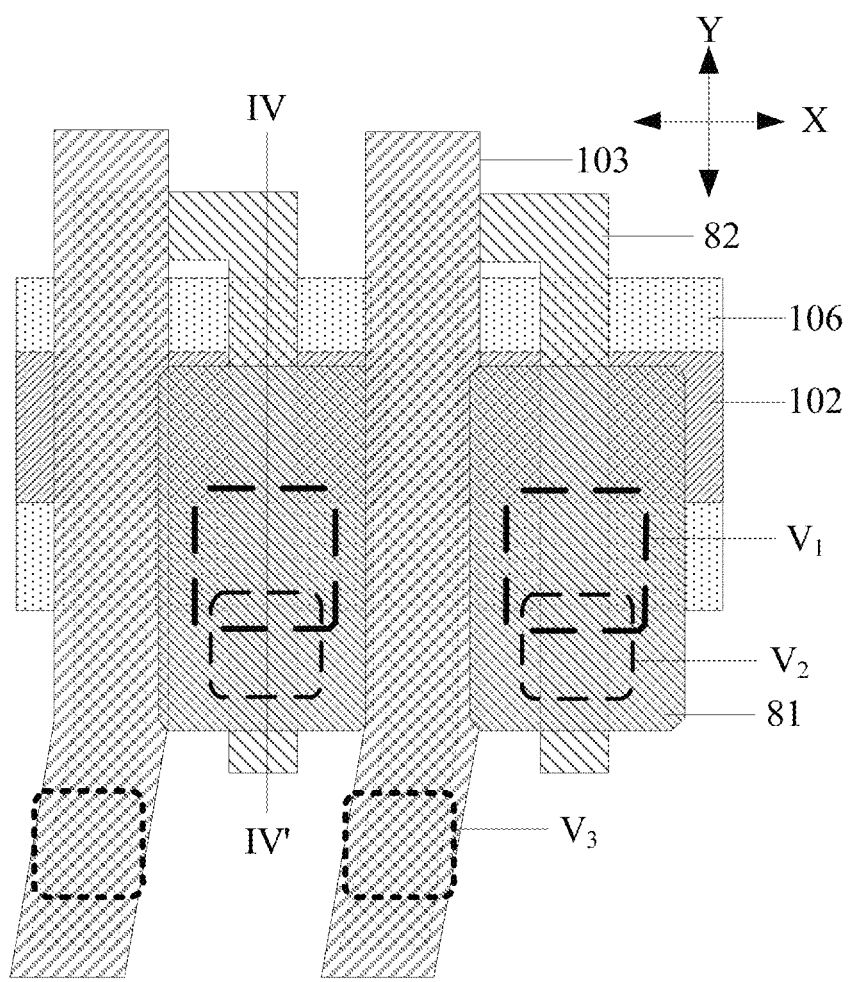
FIG. 7 is a schematic diagram of the structure of the display substrate in the related art.
Figure 8:
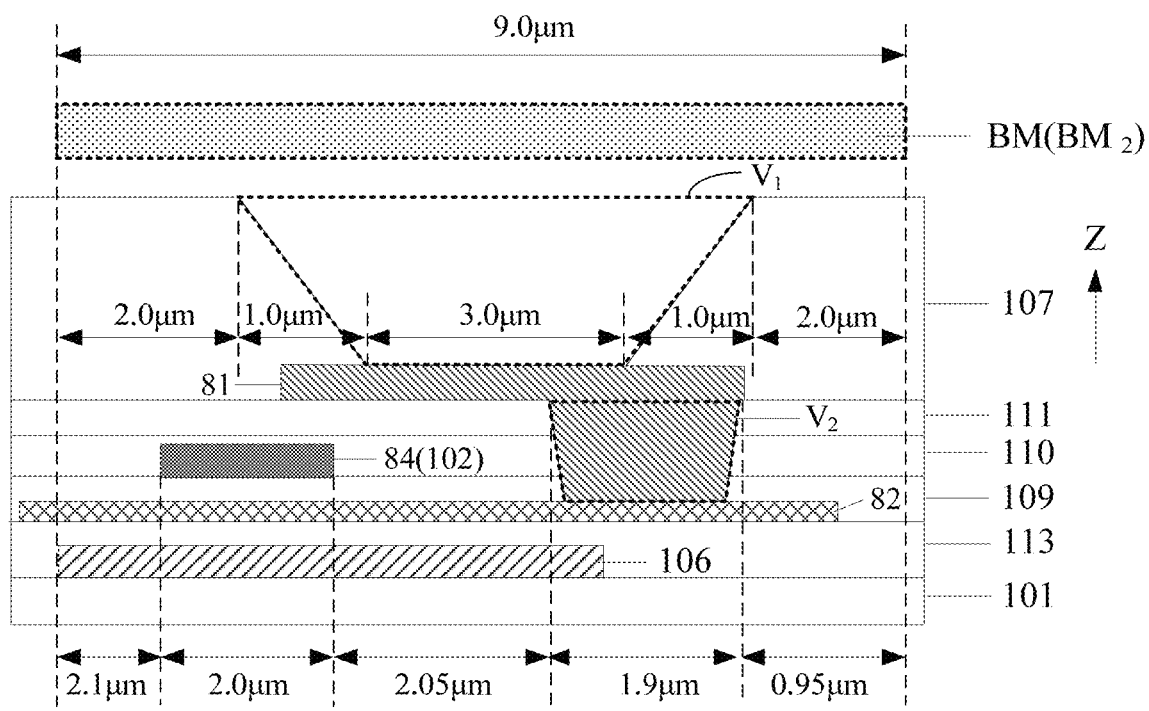
FIG. 8 is a cross-sectional view along the line IV-IV' in FIG. 7.

In related VR products, after the display substrate and the opposing substrate are box-matched, it is necessary to consider that the black matrix on the gate line direction (for example, the first direction X) can completely shade the first through hole $V_1$ of the planarization layer 107 and prevent light leakage caused by the abnormal orientation of the liquid crystal at the first through hole $V_1$. FIGS. 7 and 8 are schematic diagrams of the design of the black matrix (BM) in the gate line direction (e.g., first direction X) in the related VR product. It can be seen from FIG. 8 that the first through hole $V_1$ is a through hole with a gradually increasing aperture in the direction Z of the second light-shielding structure 106 away from the first base substrate 101. The bottom aperture of the first through hole $V_1$ is 3.0 μm and the top aperture is 5.0 μm in the related art. Theoretically, the black matrix (BM) needs to exceed the top aperture of the first through hole $V_1$ by 1.5 μm in one side, but in order to ensure the shading effect, the black matrix (BM) exceeds the top aperture of the first through hole $V_1$ in one side by a distance which should be slightly greater than the alignment ability level, such as 2.0 μm, so that the size (CD) of the black matrix (BM) in the gate line direction (e.g., the first direction X) needs to be designed to be 9.0 μm. The larger size of the black matrix (BM) directly leads to a significant reduction in the opening rate in the gate line direction (e.g., in the first direction X), which in turn leads to a lower transmittance.

Compared with the large alignment fluctuation (+1.5 μm) between the display substrate and the opposing substrate, the direct alignment between the layers on the display substrate can be accurately controlled to within +0.8 μm. Therefore, when the actual shading layer on the first direction X (equivalent to the gate line direction) is replaced with the second light-shielding structure 106 on the display substrate from the black matrix BM on the opposing substrate, the second light-shielding structure 106 can exceed 0.8 μm in one side with respect to the top aperture of the first through hole $V_1$ of the planarization layer 107. For example, exceeding 1.0 μm in one side, that is, on the same side of the symmetry axis AOS extending along the first direction X of the second light-shielding structure 106, a distance $d_1$ by which the orthographic projection of the second light-shielding structure 106 on the first base substrate 101 extends outward relative to the maximum aperture (i.e., top aperture) of the first through hole $V_1$ on the first base substrate 101, is greater than or equal to 0.8 μm and less than or equal to 1.0 μm. Compared with the scheme that the black matrix BM needs to exceed the top aperture of the first through hole $V_1$ by more than 1.5 μm (e.g., 2.0 μm) in one side, the present disclosure is more conducive to improving the opening rate and transmittance.

In some embodiments, in the display substrate provided in the present embodiment, in order to make the second light-shielding structure 106 can achieve a better shading effect on the first through hole $V_1$ on both sides of the symmetry axis AOS extending along the first direction X, of the second light-shielding structure 106, and make the width of the second light-shielding structure 106 as small as possible, so as to reduce the influence on the opening ratio, a distance by which the second light-shielding structure 106 exceeds the first through hole $V_1$ on one side of the symmetry axis AOS extending along the first direction X, of the second light-shielding structure 106 is substantially identical to a distance by which the second light-shielding structure 106 exceeds the first through hole $V_1$ on the other side of the symmetry axis AOS extending along the first direction X, of the second light-shielding structure 106 (i.e., the same or within the error range caused by factors such as manufacturing process and measurement). In other words, the orthographic projection of the symmetry axis AOS extending along the first direction X, of the second light-shielding structure 106 on the first base substrate 101 can roughly coincide with the orthographic projection of the symmetry axis extending along the first direction X, of the first through hole $V_1$ on the first base substrate 101 (i.e., coincident or within the range of deviations caused by factors such as measurements).

For example, the second light-shielding structure 106 exceeds the first through hole $V_1$ by 1.0 μm on both sides of the symmetry axis extending along the first direction X, and when the top aperture of the first through hole $V_1$ is 5.0 μm, the second light-shielding structure 106 extending on the second direction Y (i.e., the actual shading layer) only needs a width of 7.0 μm to meet the shading requirements of the ultra-high-resolution VR product on the second direction Y. It is equivalent to using a 7.0 μm wide second light-shielding structure 106 to achieve the shading effect of a 9.0 μm wide black matrix BM with the same pixel structure, so that the opening rate and transmittance can be greatly improved.

Figure 9:
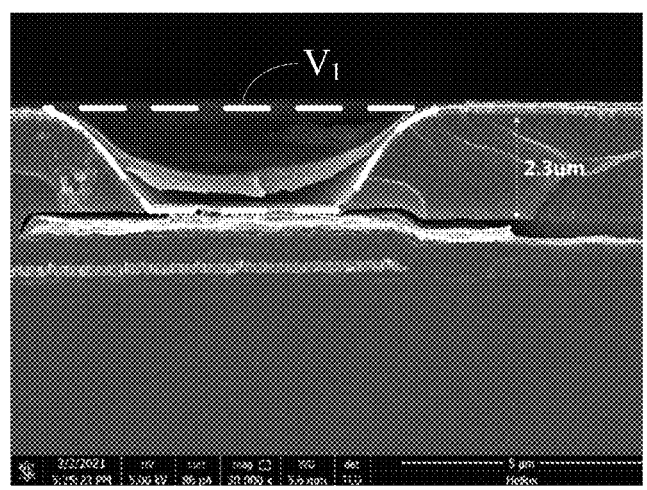
FIG. 9 is a picture of the first through hole of the planarization layer in the related art.
Figure 10:
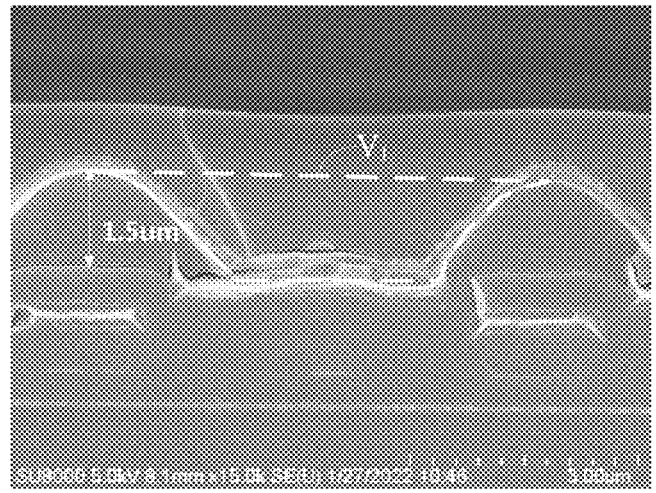
FIG. 10 is a picture of the first through hole of the planarization layer provided by an embodiment of the present disclosure.

In general, the thicker the film layer is, the harder it is to form a small hole through the thickness of the film layer, and based on this, the first through hole $V_1$ with a reduced aperture can be formed by reducing the thickness of the planarization layer 107 in the present disclosure. In view of the fact that the limit aperture of the organic layer that can be fabricated in the related art is 2.5 μm, in order to minimize the width of the second light-shielding structure 106 shading the first through hole $V_1$, the bottom aperture of the first through hole $V_1$ can be compressed from 3.0 μm to 2.5 μm, and the thickness of the planarization layer 107 is correspondingly reduced from 2.3 μm in the related art to 1.2 μm~1.8 μm, such as 1.5 μm. FIG. 9 and FIG. 10 are SEM images of the first through hole $V_1$ in the planarization layer 107 with a thickness of 2.3 μm and 1.5 μm, respectively, and it can be seen from FIG. 9 and FIG. 10 that the first through hole $V_1$ with good morphology is formed in two planarization layers 107 with different thicknesses, indicating that the process of making the first through hole $V_1$ with a bottom aperture of 2.5 μm is stable and normal. In this case, the width of the second light-shielding structure 106 shading the first through hole $V_1$ can be reduced from 7.0 μm to 6.5 μm, and the opening efficiency and transmittance are further improved.

In some embodiments, the display substrate provided in the present embodiments, as shown in FIG. 2 and FIG. 4, further includes a gate insulating layer 109, a first interlayer dielectric layer 110 and a second interlayer dielectric layer 111 which are located between the layer where the first electrode 81 of the transistor 108 is and the active layer 82 of the transistor 108. The first electrode 81 of the transistor 108 is electrically connected with the active layer 82 of the transistor 108 through the second through hole $V_2$ penetrating through the interlayer dielectric layer 111, the first interlayer dielectric layer 110 and the gate insulating layer 109. In some embodiments, as shown in FIG. 5, the orthographic projection of the second through hole $V_2$ on the first base substrate 101 is within the orthographic projection of the second light-shielding structure 106 on the first base substrate 101, so as to completely shade the second through hole $V_2$ through the second light-shielding structure 106 and avoid light leakage at the second through hole $V_2$.

In some embodiments, in the display substrate provided in the present embodiments, as shown in FIG. 5 and FIG. 6, the aperture of the second through hole $V_2$ gradually increases in the direction Z of the second light-shielding structure 106 away from the first base substrate 101, and in order to ensure the shading effect of the second light-shielding structure 106 on the second through hole $V_2$, the present disclosure arranges that on the same side of the symmetry axis AOS extending along the first direction X of the second light-shielding structure 106, a distance $d_2$ by which the orthographic projection of the second light-shielding structure 106 on the first base substrate 101 extends outward relative to the maximum aperture of the second through hole $V_2$ on the first base substrate 101, is greater than or equal to 0.5 μm and less than or equal to 0.9 μm, for example, 0.6 μm.

Continuing to refer to FIG. 5, in the related art, the maximum aperture of the second through hole $V_2$ has been extremely compressed to the limit of 1.9 μm of the inorganic-layer through hole, which is close to the limit level of the exposure machine. However, in the case that the first signal line 102 is partially used as the gate 84, due to the characteristics of the ultimate channel aspect ratio (W/L) of the transistor 108, in order to avoid the short channel effect, the line width of the first signal line 102 has been compressed from 3.5 μm to 2.0 μm, which has approached the lower limit of the characteristics of the ultimate channel aspect ratio and cannot be further compressed. Therefore, in order to further reduce the width of the second light-shielding structure 106 that shades the first signal line 102 and the second through hole $V_2$, the distance between the second through hole $V_2$ and the first signal line 102 needs to be compressed.

Figure 11:
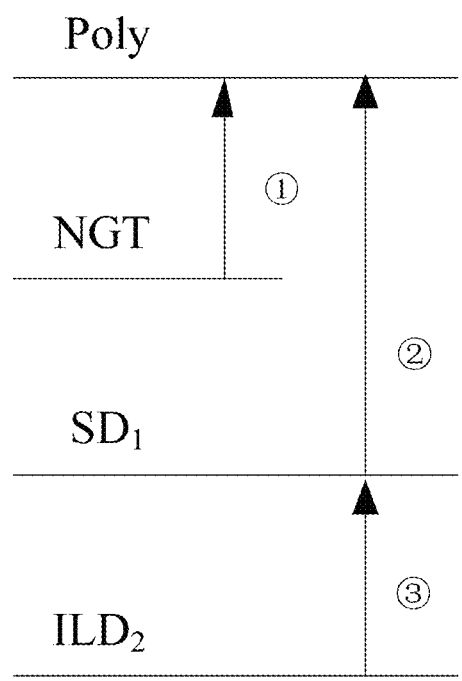
FIG. 11 is a schematic diagram of the alignment mode of some layers of the display substrate in the related art.

In related art, the alignment mode between the layer $ILD_2$ where the second through hole $V_2$ is, the layer $SD_1$ where the second electrode 83 of the transistor 108 is, the layer NGT where the gate 84 of the transistor 108 is, and the layer Poly where the active layer 82 of the transistor 108 is located, is an indirect alignment, and the corresponding alignment control mode is shown in FIG. 11. As shown in FIG. 11, in the related art, the first alignment is carried out between the layer NGT where the gate 84 of the transistor 108 is and the layer Poly where the active layer 82 of the transistor 108 is, the second alignment is carried out between the layer $SD_1$ where the second electrode 83 of the transistor 108 is and the layer Poly where the active layer 82 of the transistor 108 is, and the third alignment is carried out between the layer $ILD_2$ where the second through hole $V_2$ is and the layer $SD_1$ where the second electrode 83 of the transistor 108 is. Through these three alignments, the indirect alignment of the layer NGT where gate 84 of the transistor 108 is and the layer $ILD_2$ where the second through hole $V_2$ is can be realized.

In the case of the alignment control mode shown in FIG. 11, the minimum distance between the first signal line 102 (which can be located in the layer NGT where gate 84 of the transistor 108 is) and the second through hole $V_2$ should be a $\sqrt{+2b^2+d^2+e^2+f^2}$, a is the length of the light doping region (LDD) of the active layer 80 of the transistor 108 in the second direction Y, and b is ½ of the process fluctuation value of the first signal line 102 and the second through hole $V_2$, d is the alignment deviation of the layer NGT where the gate 84 of the transistor 108 is and the layer Poly where the active layer 82 of the transistor 108 is, e is the alignment deviation of the layer $SD_1$ where the second electrode 83 of the transistor 108 is and the layer Poly where the active layer 82 of the transistor 108 is, and f is the alignment deviation between the layer $ILD_2$ where the second through hole $V_2$ is and the layer $SD_1$ where the second electrode 83 of the transistor 108 is. In related art, the length a of the light doping region (LDD) of the active layer 80 in the second direction Y is 0.75 μm, and the control benchmark of the process fluctuation value and alignment deviation of each layer in the display substrate is +0.8 μm, which can be reduced to +0.7 μm through strict control, so d, e, and f are all 0.7 μm~0.8 μm, and the process fluctuation values of the first signal line 102 and the second through hole $V_2$ are 0.7 μm~0.8 μm, and correspondingly, b is 0.35 μm~0.4 μm. Combined with the above formula, it can be obtained that the minimum distance between the first signal line 102 (which can be located in the layer NGT where gate 84 of the transistor 108 is) and the second through hole $V_2$ is about 2.05 μm~2.25 μm in the related art.

In the present disclosure, the first signal line 102 and the second through hole $V_2$ can be directly aligned to reduce the total alignment deviation between the first signal line 102 and the second through hole $V_2$, then reduce the distance between the first signal line 102 and the second through hole $V_2$. Specifically, as shown in FIG. 5, the orthographic projection of the first signal line 102 on the first base substrate 101 and the orthographic projection of the second through hole $V_2$ on the first base substrate 101 are respectively located on both sides of the symmetry axis AOS extending along the first direction X, of the second light-shielding structure 106. In the second direction Y, the distance $d_3$ between the orthographic projection of the first signal line 102 on the first base substrate 101 and the orthographic projection of the maximum aperture of the second through hole $V_2$ on the first base substrate 101 can be approximately equal to a+$\sqrt{2b^2+c^2}$ (i.e., equal to or in the cause of production, within the error range caused by measurement and other factors), a is the length of the light doping region (LDD) of the active layer 80 in the transistor 108 in the second direction Y, b is ½ of the process fluctuation value of the first signal line 102 and the second through hole $V_2$, and c is the alignment deviation of the first signal line 102 and the second through hole $V_2$.

In some embodiments, the length a of the lightly doped region (LDD) of the active layer 80 in the second direction Y is 0.75 μm, the process fluctuation values of the first signal line 102 and the second through hole $V_2$ are 0.7 μm~0.8 μm, and correspondingly, b is 0.35 μm~0.4 μm, and the alignment deviation of the first signal line 102 and the second through hole $V_2$ is 0.7 μm~0.8 μm, combined with the formula a $\sqrt{+2b^2+c^2}$, it can be obtained that the distance $d_3$ between the orthotropic projection of the first signal line 102 on the first base substrate 101 and the orthographic projection of the second through hole $V_2$ on the first base substrate 101 is about 1.6 μm~1.7 μm. Comparing the distance of 2.05 μm~2.25 μm between the first signal line 102 and the second through hole $V_2$ in the related art, it can be seen that the distance of 1.6 μm~1.7 μm between the first signal line 102 and the second through hole $V_2$ in the present disclosure is smaller, so as to reduce the width of the second light-shielding structure 106 shading the first signal line 102 and the second through hole $V_2$ and improve the opening rate and transmittance.

Figure 12:
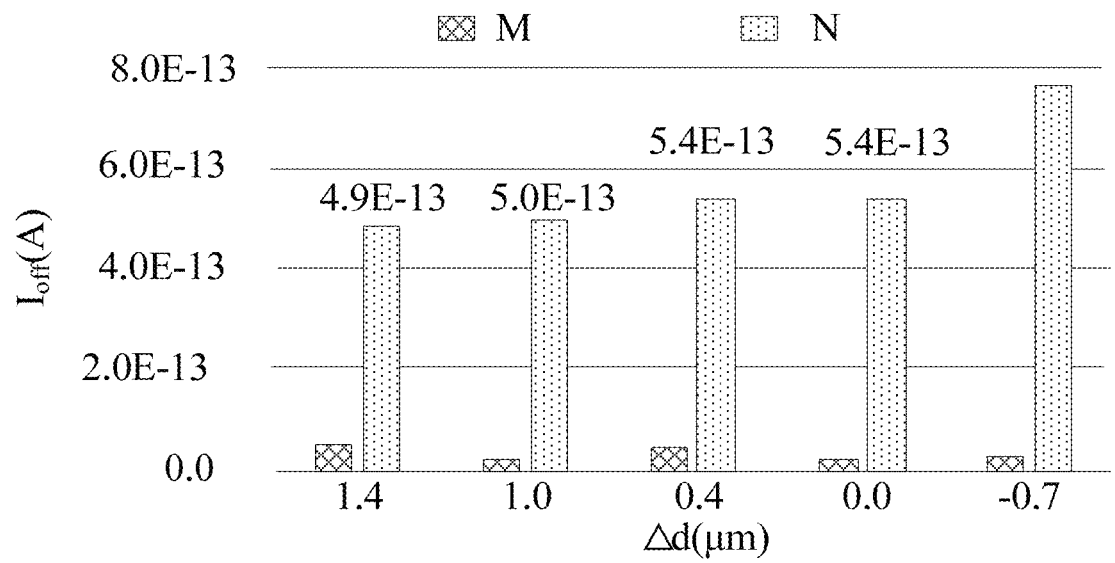
FIG. 12 is a relationship between the distance between the second light-shielding structure and the first signal line, and the leakage current of the transistor.
Figure 13:
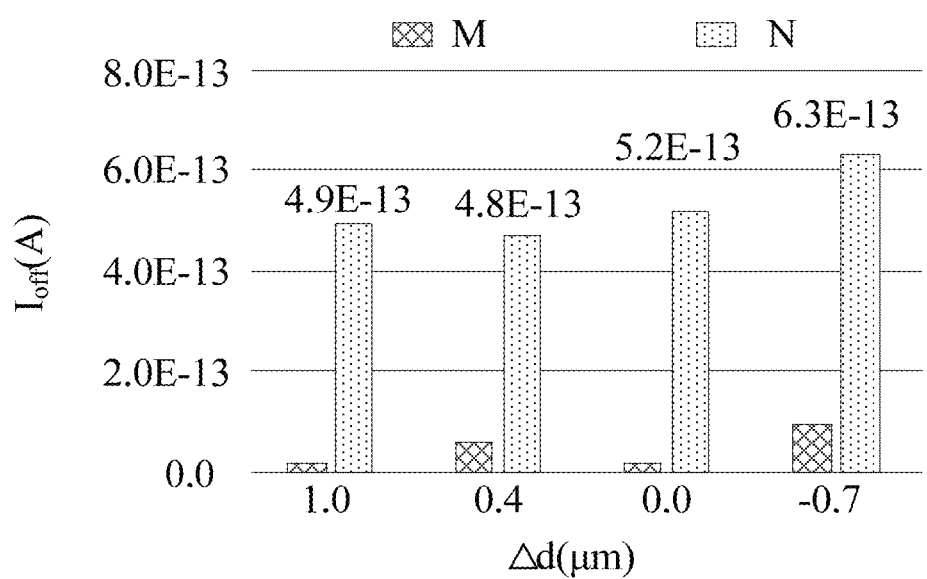
FIG. 13 is another relationship between the distance between the second light-shielding structure and the first signal line, and the leakage current of the transistor.

As shown in FIG. 8, in the related art, the distance by which the second light-shielding structure 106 exceeds the first signal line 102 is more than 2.1 μm, so as to ensure that the second light-shielding structure 106 completely shades the light doping region (LDD) and the channel region of the active layer 82, and ensure the characteristics of the transistor 108. FIG. 12 and FIG. 13 show verification of leakage current $I_{off}$, in a case that the line width of the first signal line 102 (equivalent to the width of the gate 84 of the transistor 108) is 2.0 μm and 1.8 μm, the distance between the second light-shielding structure 106 and the first signal line 102 is Δd, and the illumination is 2 w. Δd being greater than 0 indicates that the second light-shielding structure 106 exceed outward relative to the first signal line 102, Δd being less than 0 indicates that the second light-shielding structure 106 indents inward relative to the first signal line 102, and Δd being equal to 0 indicates that the second light-shielding structure 106 is flush with the first signal line 102. In addition, in FIG. 12 and FIG. 13, M represents a scheme in which the second light-shielding structure 106 exceeds 2.1 μm with respect to the first signal line 102 in the related art, and N represents a scheme in which the distance between the second light-shielding structure 106 and the first signal line 102 in the present disclosure is Δd. Tables 1 and 2 show the leakage current $I_{off}$, in a case that the line width of the first signal line 102 (equivalent to the width of the gate 84 of the transistor 108) is 2.0 μm and 1.8 μm, the distance between the second light-shielding structure 106 and the first signal line 102 is Δd, and the illumination is 2 w, and the leakage current $I_{off}$ under the condition of darkness (no light), respectively. As shown in FIG. 12, FIG. 13, Table 1 and Table 2, when the distance by which the second light-shielding structure 106 exceeds the first signal line 21 is compressed from 2.1 μm to be within 1.0 μm (e.g., within 0.4 μm), the leakage current ($I_{off}$) of transistor 108 is smaller, and the flicker (FLK) of the product is not abnormal.

TABLE 1

| | Δd(μm) | | | | |
|---|---|---|---|---|---|
| | 1.4 | 1 | 0.4 | 0 | −0.7 |
| $I_{off}'$(A) | 5.4E−14 | 2.2E−14 | 4.6E−14 | 1.9E−14 | 2.8E−14 |
| $I_{off}$(A) | 4.9E−13 | 5.0E−13 | 5.4E−13 | 5.4E−13 | 7.6E−13 |

TABLE 2

| | $\Delta_{d(\mu m)}$ | | | |
|---|---|---|---|---|
| | 1 | 0.4 | 0 | −0.7 |
| $I_{off}'(A)$ | 1.7E−14 | 6.3E−14 | 1.5E−14 | 9.6E−14 |
| $I_{off}(A)$ | 4.9E−13 | 4.8E−13 | 5.2E−13 | 6.3E−13 |

Based on this, the disclosure can compress the distance by which the second light-shielding structure 106 exceeds the first signal line 21 from 2.1 μm to within 0.4 μm, such as 0.3 μm, so that on the basis of ensuring the characteristics of the transistor 108, the shading of the second light-shielding structure 106 to the first signal line 102 is minimized, and the opening rate and transmittance are greatly improved. Specifically, as shown in FIG. 5 and FIG. 6, the orthographic projection of the first signal line 102 on the first base substrate 101 is on one side of the orthographic projection of the symmetry axis AOS of the second light-shielding structure 106 along the first direction X on the first base substrate 101. On the same side of the symmetry axis AOS of the second light-shielding structure 106 along the first direction X, the distance $d_4$ by which the orthographic projection of the second light-shielding structure 106 on the first base substrate 101 exceeds outward relative to the orthographic projection of the first signal line 102 on the first base substrate 101, is greater than 0 μm and less than or equal to 0.4 μm, for example, 0.3μ m.

In some embodiments, in the display substrate provided in the present embodiments, as shown in FIG. 5 and FIG. 6, the orthographic projection of the first electrode 81 of the transistor 108 on the first base substrate 101 may be within the orthographic projection of the second light-shielding structure 106 on the first base substrate 101, so that only the second light-shielding structure 106 is used for shading in the first direction X, so that the opening rate and transmittance in the first direction X are maximally enhanced.

In some embodiments, the display substrate provided in the present embodiments, as shown in FIGS. 1 to 4, further includes a common electrode 112 on one side away from the first base substrate 101, of the layer where the pixel electrodes 104 are. The first light-shielding structures 105 are in contact with the common electrode 112. Because the common electrode 112 in the area where each pixel electrode 104 is located is connected as a whole, even if the common electrode 112 is in contact with the first light-shielding structures 105, there is no problem that the common electrode 112 in the areas where the different pixel electrodes 104 are located is short-circuited, and based on this, the first light-shielding structures 105 and the common electrode 112 can directly contact without arranging an insulating layer between them, so as to minimize the thickness of the display substrate and the manufacturing process as much as possible while the first light-shielding structure 105 is realizing to shade the light leakage.

In some embodiments, in the display substrate provided in the present embodiments, as shown in FIG. 3 and FIG. 4, the first light-shielding structures 105 may be on one side facing the first base substrate 101, of the common electrode 112. The orthographic projection of the first light-shielding structures 105 on the first base substrate 101 is within the orthographic projection of the common electrode 112 on the first base substrate 101, and the common electrode 112 covers the lateral surface of the first light-shielding structures 105, so that the patterning process of the common electrode 112 can avoid causing damage to the morphology of the first light-shielding structures 105.

In some embodiments, in the display substrate provided in the present embodiment, as shown in FIG. 1 and FIG. 2, the first light-shielding structures 105 may also be on one side facing away from the first substrate 101, of the common electrode 112. The orthographic projection of the first light-shielding structures 105 on the first base substrate 101 roughly coincides with the orthographic projection of the common electrode on the first base substrate 101 at the gap between each column of pixel electrodes 104 extending in the second direction Y, that is, the orthographic projection of the common electrode 112 on the first base substrate 101 and the orthographic projection of the first light-shielding structures 105 on the first base substrate 101 can coincide exactly, and it is also possible to have non overlapping parts within a reasonable range of process errors. When the first light-shielding structures 105 are located on one side away from the first base substrate 101, of the common electrode 112, in the preparation process of the display substrate, a film layer of the common electrode 112 and a film layer of the first light-shielding structures 105 can be formed sequentially, and then a patterning process is carried out, so that the self-alignment between the first light-shielding structures 105 and the common electrode 112 can be realized, so that there is no alignment deviation between the first light-shielding structures 105 and the common electrode 112.

In some embodiments, in the display substrate provided in the present embodiment, as shown in FIG. 1 and FIG. 3, the common electrode 112 may include a plurality of slits S extending along the second direction Y, each pixel electrode 104 is correspondingly arranged with at least one slit S, and the orthotropic projection of the slits S on the first base substrate 101 and the orthographic projection of the first light-shielding structures 105 on the first base substrate 101 do not overlap with each other, so as to avoid the first light-shielding structures 105 from shading the slits S and ensure the transmittance at the slit S.

In some embodiments, the above-mentioned display substrates provided in the present embodiments, as shown in FIG. 2 and FIG. 4, may further include a buffer layer 113, a passivation layer 114 and the like. The other indispensable components of the display substrate should be understood by a person skilled in the art and shall not be repeated herein, nor shall they be used as a restriction on the present disclosure.

Figure 14:
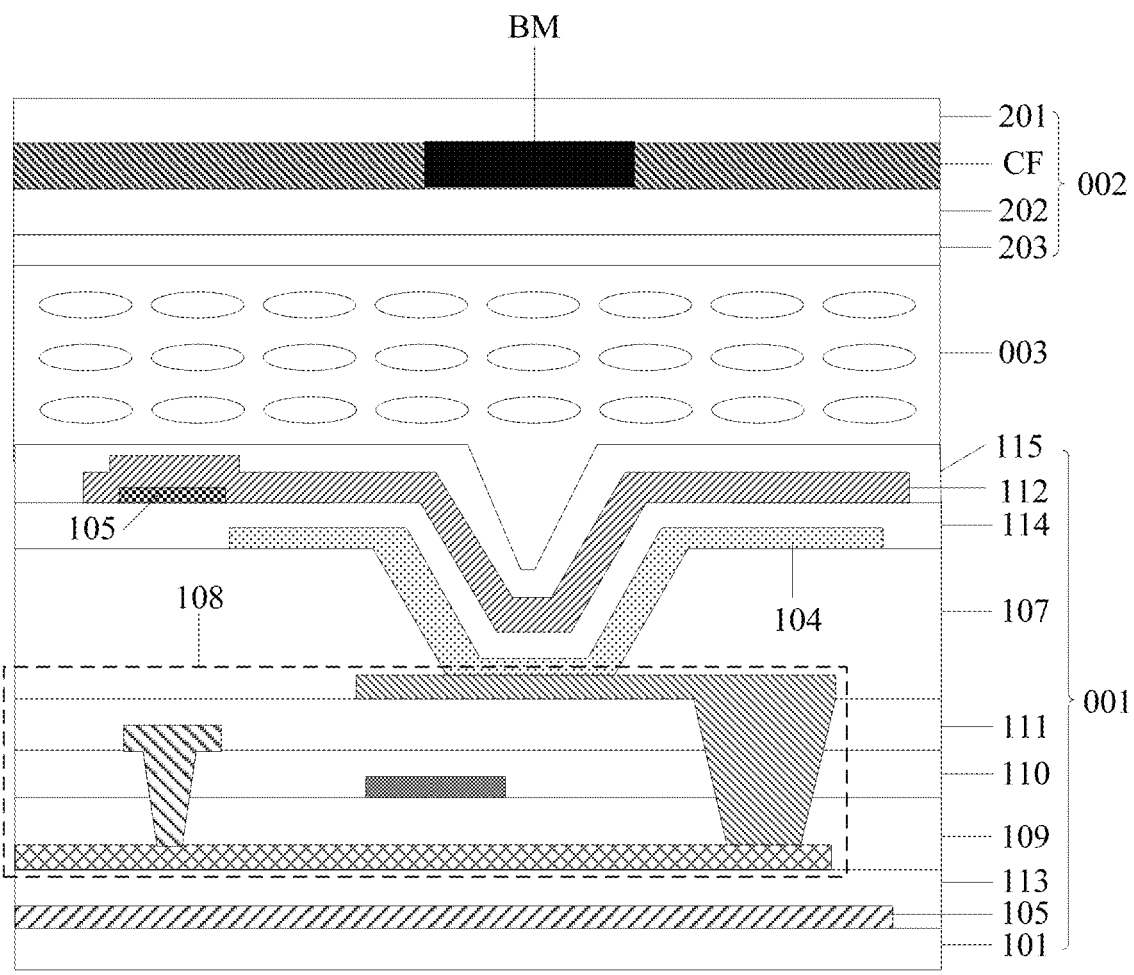
FIG. 14 is a structural schematic diagram of the display device provided by an embodiment of the present disclosure.

Based on the same invention conception, the embodiment of the disclosure provides a display device, as shown in FIG. 14, including a display substrate 001 and an opposing substrate 002, and a first liquid crystal layer 003 positioned between the display substrate 001 and the opposing substrate 002. The display substrate 001 is the display substrate 001 provided by aforementioned embodiments of the present disclosure. Because the principle of solving the problem of the display device is similar to the principle of solving the problem of the display substrate, the implementation of the display device provided in the embodiment of the present disclosure may refer to the implementation of the display substrate provided in the embodiment of the present disclosure, and will not be repeated.

Figure 15:
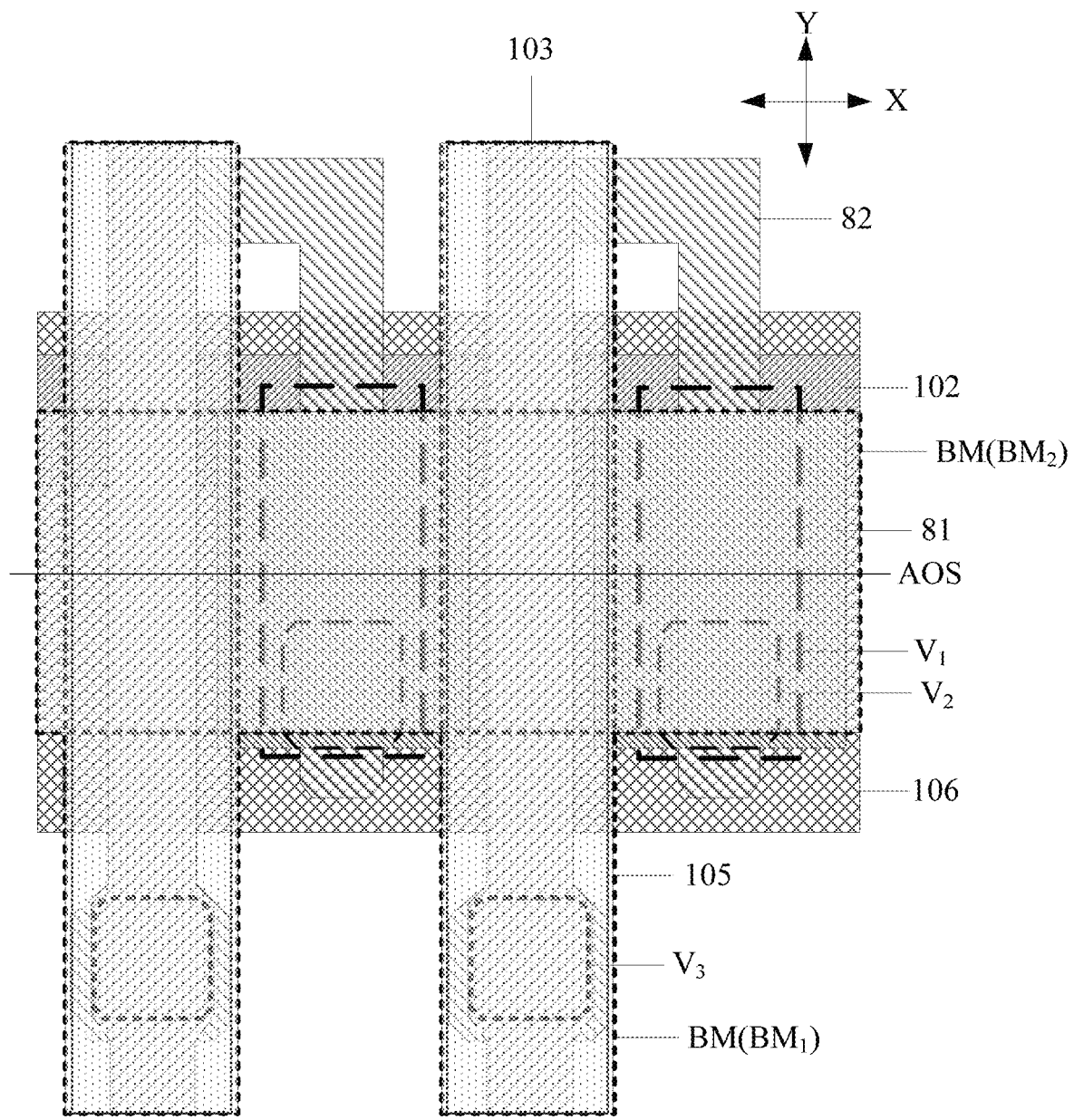
FIG. 15 is another structural schematic diagram of the display device provided by an embodiment of the present disclosure.

In some embodiments, in the display device provided in the present disclosed embodiments, as shown in FIG. 15, the opposing substrate 002 includes a black matrix BM. The black matrix BM may include a plurality of first black matrixes $BM_1$ extending in the second direction Y and arranged in the first direction X. The orthographic projection of the first light-shielding structures 105 on the first base substrate 101 may be within the orthographic projection of the first black matrixes $BM_1$ on the first base substrate 101, so as to avoid the first light-shielding structures 105 affecting the opening rate and transmittance in the second direction Y.

In some embodiments, in the display device provided in the present embodiments, as shown in FIG. 15, the black matrix BM may also include a plurality of second black matrixes $BM_2$ extending in the first direction X and arranged in the second direction Y. The orthographic projection of the second black matrixes $BM_2$ on the first base substrate 101 is within the orthographic projection of the second light-shielding structures 106 on the first base substrate 101. The width of the second black matrix $BM_2$ in the second direction Y is greater than or equal to the width of the minimum aperture (i.e., the bottom aperture) of the first through hole $V_1$ in the second direction Y and is less than the width of the maximum aperture (i.e., the top aperture) of the first through hole $V_1$ in the second direction Y. The present disclosure adopts the second light-shielding structures 106 in the first direction X to meet the shading requirements, therefore, the second black matrixes $BM_2$ extending in the first direction X can be reduced in size, for example, the width of the second black matrixes $BM_2$ in the second direction Y is greater than or equal to 3.0 μm and less than or equal to 5.0 μm, and the main function of the second black matrixes $BM_2$ is changed from shading to reducing the reflectivity in the first direction X.

In some embodiments, in the display device provided in the present embodiments, as shown in FIG. 15, in order to simplify the design, the orthographic projection of the symmetry axis extending along the first direction X, of the second black matrix $BM_2$ on the first base substrate 101 and the orthographic projection of the symmetry axis AOS extending along the first direction X, of the second light-shielding structure 106 along the first direction X on the first base substrate 101 can roughly coincide, that is, coincide properly or is within the error range caused by factors such as manufacturing process and measurement.

In some embodiments, as shown in FIG. 15, the opposing substrate 002 may also include a color-resistant CF and a sealing adhesive SA. The color-resistant CF may be arranged in an opening limited by the first black matrix $BM_1$ and the second black matrix $BM_2$. The other indispensable components of the opposing substrate should be understood by a person of ordinary skill in the art, and shall not be repeated herein, nor shall they be used as a restriction on the present disclosure.

Figure 16:
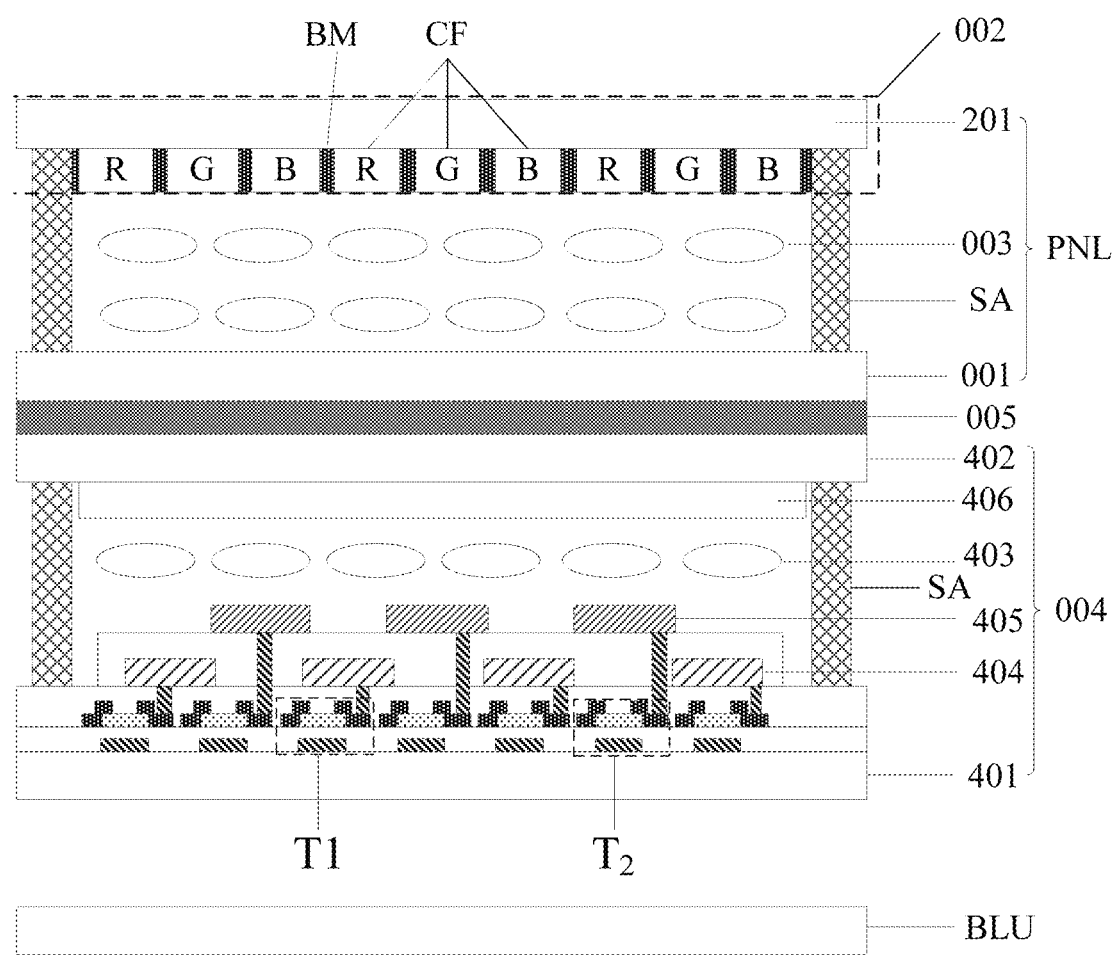
FIG. 16 is another structural schematic diagram of the display device provided by an embodiment of the present disclosure.
Figure 17:
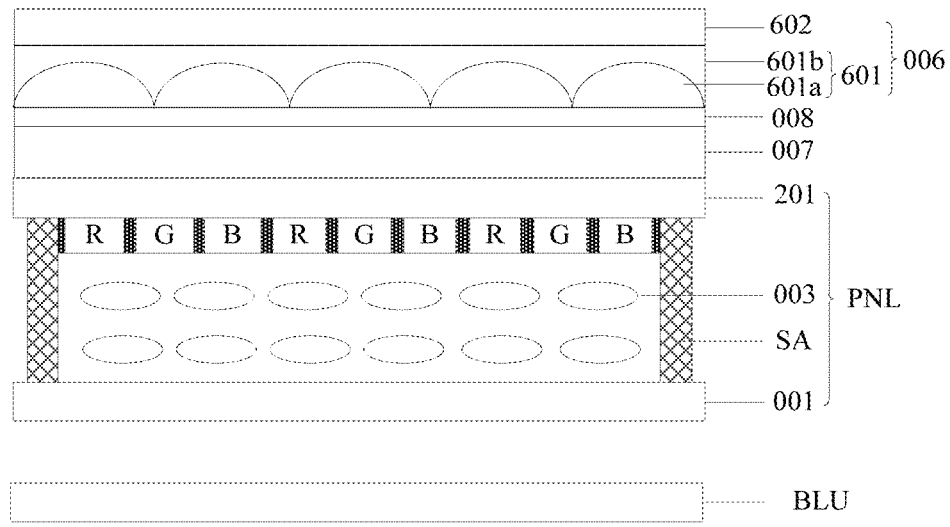
FIG. 17 is another structural schematic diagram of the display device provided by an embodiment of the present disclosure.

In some embodiments, the display device provided in the present disclosed embodiments, as shown in FIG. 16 and FIG. 17, may further include a backlight module BLU on one side away from the opposing substrate 002, of the display substrate 001. The backlight module BLU may be a direct-type backlight module or a side-entry backlight module. In some embodiments, the side-entry backlight module may include a light bar, and a reflector a light guide plate, a diffuser sheet, a prism group, etc., arranged in a stacked manner. The light bar is on the side of the light guide plate thickness direction. The direct-type backlight module may include a matrix light source, and a reflector, a diffusion plate and a brightness enhancement film, etc., stacked on the light-emitting side of the matrix light source. The reflector includes an opening that is directly opposite to the position of each lamp bead in the matrix light source. The lamp beads in the light bar and the lamp beads in the matrix light source can be light-emitting diodes (LEDs), such as miniature light-emitting diodes (Mini LEDs, Micro LEDs, etc.).

Micro light-emitting diodes (LEDs) in the sub-millimeter or even micron are self-emitting devices as organic light-emitting diodes (OLEDs) and they have a series of advantages like organic light-emitting diodes, such as high brightness, ultra-low latency, and ultra-large viewing angle. In addition, because the micro light-emitting diodes emit light based on metal semiconductors with more stable properties and lower resistance, they has the advantages of lower power consumption, higher temperature and low temperature resistance, and longer service life than organic light-emitting diodes that emit light based on organic matter. When the micro light-emitting diodes are used as the backlight, they can achieve a more precise dynamic backlight effect, which can effectively improve the brightness and contrast of the screen, and at the same time, they can also solve the glare phenomenon caused by the traditional dynamic backlight between the bright and dark areas of the screen, and optimize the visual experience.

In some embodiments, the display device provided in the embodiment of the disclosure may be a 3D display device, as shown in FIG. 16, the 3D display device may also include a liquid crystal grating 004 positioned between the backlight module BLU and the display substrate 001. The liquid crystal grating 004 can be fixed together with the display substrate 001 through an adhesive layer 005. In some embodiments, according to the current position where the viewer's eyes are, the liquid crystal grating 004 can be controlled to form an alternately arranged light transmission area and a light blocking area, so that the viewer's left eye can see the left-eye image displayed by the display panel PNL (including the display substrate 001, the opposing substrate 002, the first liquid crystal layer 003, the sealing glue SA, etc.) through the light transmission area of the liquid crystal grating 004, and the right eye can see the right-eye image displayed by the display panel PNL through the light transmission area. By arranging the liquid crystal grating 004 on the light incident side of the display panel PNL, when the display panel PNL includes touch electrodes, the liquid crystal grating 004 does not shield the touch electrodes to avoid the problem of touch failure, so that the touch sensitivity and accuracy can be improved.

In some embodiments, as shown in FIG. 16, the liquid crystal grating 004 may include a third base substrate 401 and a fourth base substrate 402 opposite each other, a second liquid crystal layer 403 between the third base substrate 401 and the fourth base substrate 402, a first striped electrode 404 on one side towards the second liquid crystal layer 403, of the third base substrate 401, a second striped electrode 405 on a side facing the second liquid crystal layer 403, of a layer where the first strip electrode 404, a planar electrode 406 on a side facing the second liquid crystal layer 403, of the fourth base substrate 402, a first transistor $T_1$ electrically connected to the first strip electrode 404, a second transistor $T_2$ electrically connected to the second strip electrode 405, and a sealing adhesive SA enclosing the second liquid crystal layer 403 between the third base substrate 401 and the fourth base substrate 402. In some embodiments, by powering up the first strip electrode 404, the second strip electrode 405 and the surface electrode 406, the second liquid crystal layer 403 can be controlled to form a light transmission area and a light shading area, so as to cooperate with the liquid crystal display panel PNL that outputs a left-eye image and a right-eye image to realize 3D display.

In some embodiments, the display device provided in the embodiment of the disclosure may be a 3D display device, as shown in FIG. 17, the 3D display device may further include a light splitting assembly 006 positioned at the light-emitting side of the display panel PNL. In some embodiments, the light splitting assembly 006 includes a plurality of light-splitting structures 601 parallel to each other and arranged side by side. The light-splitting structure 601 may be a composite lens formed by a high-refraction resin layer 601*a* and a low-refraction resin layer 601*b*. Specifically, the high-refraction resin layer 601*a* includes a plurality of cylindrical lenses. The low-fold resin layer 601*b* fills the gap of each cylindrical lens, and the thickness of the low-refraction resin layer is greater than the arch height of the cylindrical lens. The cylindrical lenses may be edged or non-edged. In some embodiments, the composite lens can be made of transparent material as substrate 602 or, for example, the substrate 602 may be made of polyethylene terephthalate (PET). In some embodiments, a space glass 007 may be arranged between the display panel PNL and the light splitting assembly 006. The space glass 007 and the light splitting assembly 006 are laminated and fixed through optical glue 008.

In some embodiments, by positioning the image plane of the display panel PNL on the focal plane of the cylindrical lens, the pixels below each cylindrical lens are divided into several sub-pixels. The light of the pixels at different positions on the display panel PNL are refracted and split through the cylindrical lens, and the light path changes so that different viewpoints are formed in space. When the left eye receives the left viewpoint image, the right eye also receives the right viewpoint image at the same time, and 3D display is realized.

Figure 18:
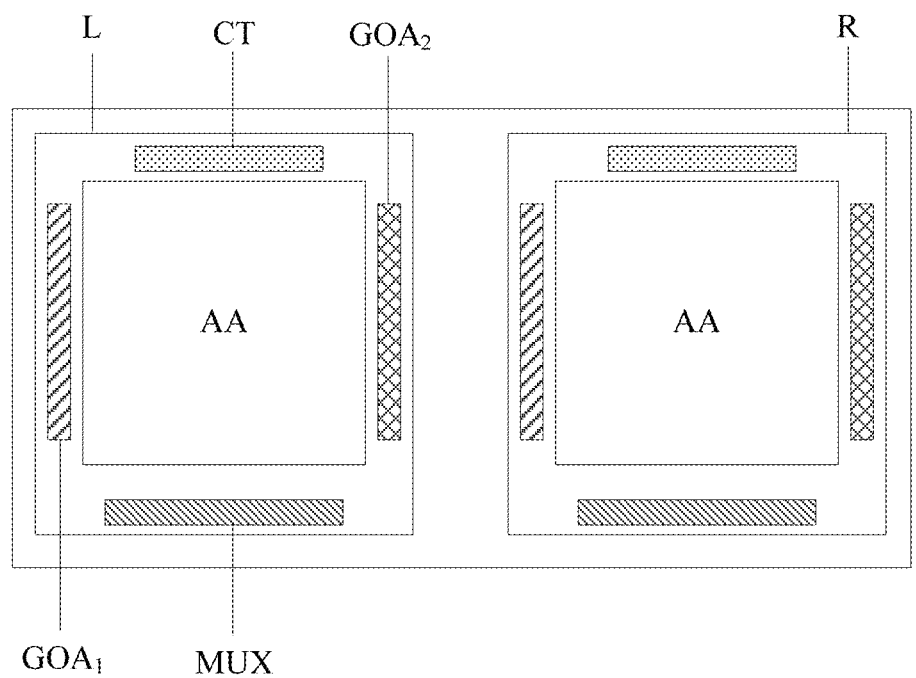
FIG. 18 is another structural schematic diagram of the display device provided by an embodiment of the present disclosure.
Figure 19:
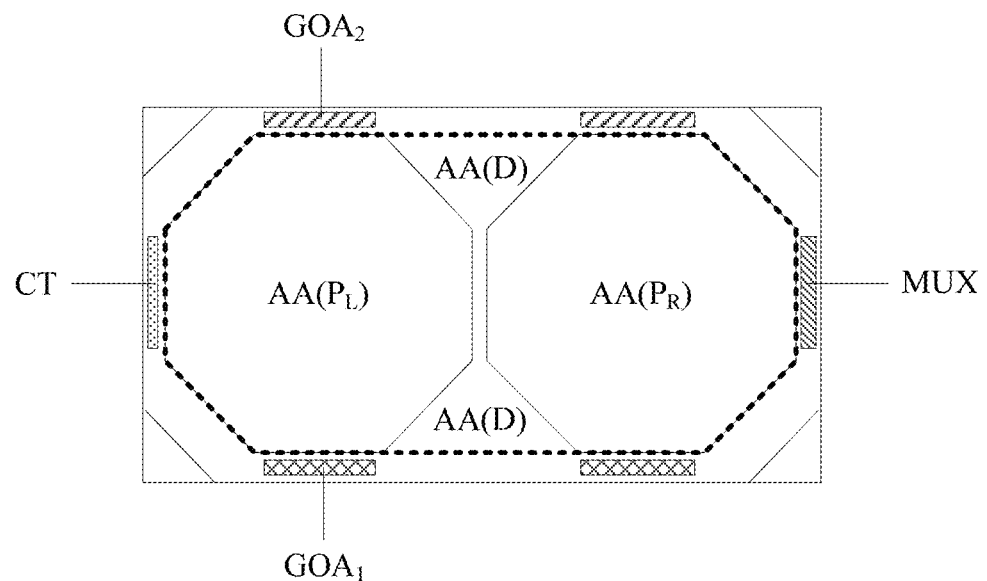
FIG. 19 is another structural schematic diagram of the display device provided by an embodiment of the present disclosure.

FIGS. 18 and 19 illustrate the display device provided in the present disclosure for use in virtual reality (VR) glasses. In some embodiments, the virtual reality glasses shown in FIG. 18 include two display screens L and R, through which different pictures are provided to the left eye and the right eye to realize virtual reality display. The two display screens L and R respectively include the display substrate provided in aforementioned embodiments of the present disclosure. The virtual reality glasses shown in FIG. 19 include one display screen, of which the display area AA includes an effective pixel area P and a virtual pixel area D. The effective pixel area P can display a picture; the virtual pixel area D cannot display a picture. The virtual pixel area D is used to prevent the film layer of the effective pixel region P from being broken off poorly. In some embodiments, the effective pixel area P includes the left eye pixel area $P_L$ and the right eye pixel area $P_R$, and the left eye pixel area $P_L$ and the right eye pixel area $P_R$ respectively display different pictures to realize virtual reality display. In some embodiments, the left eye pixel area $P_L$ and the right eye pixel area $P_L$ are regular octagons, and the display area AA is octagonal. Of course, the left eye pixel area $P_L$, the right eye pixel area $P_L$ and the display area AA can also have other shapes, and no specific restrictions are made here. Continuing with FIG. 18 and FIG. 19, it can be seen that the virtual reality glasses may also include the first gate drive circuit $GOA_1$, the second gate drive circuit $GOA_2$, the test circuit CT, and the multi-channel selection circuit, MUX arranged around the display area AA. The other indispensable components of virtual reality glasses should be understood by a person skilled in the art and shall not be repeated herein and should not be used as a limitation on the present disclosure.

In some embodiments, the display devices provided in the present embodiments may be: projectors, 3D printers, virtual reality devices, mobile phones, tablet computers, televisions, monitors, notebook computers, digital photo frames, navigators, smart watches, fitness wristbands, personal digital assistants, and any other products or parts with display functions. In some embodiments, the display devices provided in the embodiments of the present disclosure include, but are not limited to: radio frequency units, network modules, audio output & input units, sensors, display units, user input units, interface units, control chips, and other components. In some embodiments, the control chip is a central processing unit, a digital signal processor, a system-on-chip (SoC), etc. For example, the control chip may also include memory, power module, etc., and realize power supply and signal input and output functions through separately arranged wires, signal lines, etc. For example, a control chip may also include hardware circuitry as well as executable code for a computer. The hardware circuitry may include conventional Very Large Scale Integration, VLSI circuits or gate arrays, as well as existing semiconductors such as logic chips, transistors, or other discrete component. The hardware circuitry may also include field-programmable gate arrays, programmable array logic, programmable logic devices, and so on. In addition, those skilled in the art can understand that the above structure does not constitute a limitation on the display device provided in the embodiment of the present disclosure, in other words, the display device provided in the embodiment of the present disclosure may include more or fewer of the above-mentioned parts, or combine certain parts, or different parts arrangement.

Figure 20:
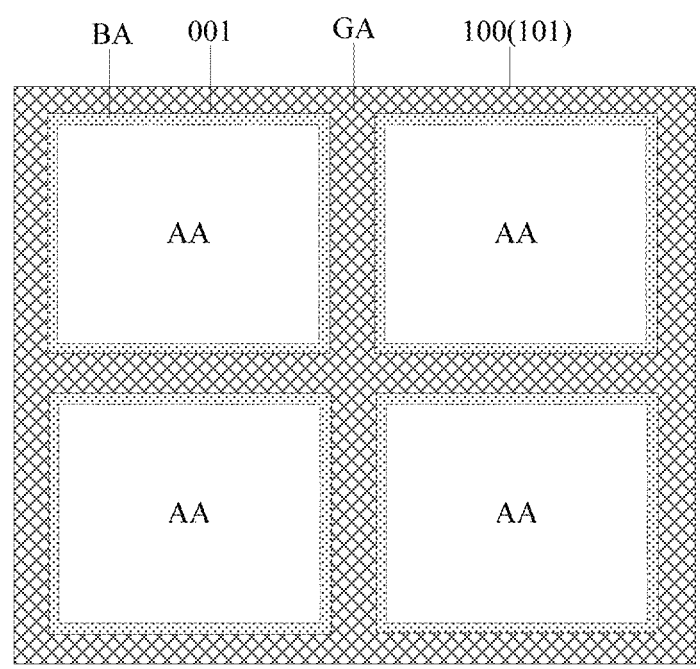
FIG. 20 is a structural schematic diagram of the motherboard provided by an embodiment of the present disclosure.

Based on the same invention conception, the embodiment of the disclosure provides a motherboard, as shown in FIG. 20, including a plurality of display substrates 001 provided by aforementioned embodiments of the present disclosure. The first base substrate 101 of each display substrate 001 forms a base substrate 100 of an integrated structure. Because the principle of solving the problem of the motherboard is similar to the principle of solving the problem of the display substrate described above, the embodiment of the disclosure provides that the implementation of the motherboard may refer to the implementation of the display substrate provided in the embodiment of the present disclosure, and will not be repeated.

In some embodiments, in the motherboard provided in the present embodiment, as shown in FIG. 20, the display substrate 001 includes a display area AA and a bezel area BA on at least one side of the display area AA. The motherboard includes a gap GA between adjacent display substrates 001. In some embodiments, the motherboard may include a plurality of first alignment marks $MK_1$ as shown in FIG. 19. The first alignment marks $MK_1$ are in the bezel area BA and/or at the gap GA between the adjacent display substrates 001. It should be noted that after the motherboard is split into multiple display substrates 001, the first alignment mark $MK_1$ in the bezel area BA can be retained, and the first alignment mark $MK_1$ at the gap GA between adjacent display substrates 001 is cut off.

Figure 21:
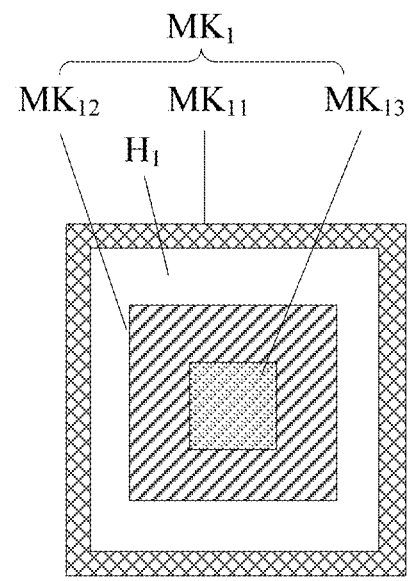
FIG. 21 is a structural schematic diagram of the first alignment identification provided by an embodiment of the present disclosure.

In some embodiments, as shown in FIG. 21, the first counterpoint identifier $MK_1$ may include a first sub-alignment pattern $MK_{11}$, a second sub-alignment pattern $MK_{12}$ and a third sub-alignment pattern $MK_{13}$. The first sub-alignment pattern $MK_{11}$ includes a first hollow structure $H_1$, and the orthographic projection of the second sub-alignment pattern $MK_{12}$ on the base substrate 100 is within the orthographic projection of the first hollow structure $H_1$ on the base substrate 100. The orthotropic projection of the third sub-alignment pattern $MK_{13}$ on the base substrate 100 is located in the orthographic projection of the second sub-alignment pattern $MK_{12}$ on the base substrate 100. In some embodiments, the first sub-alignment pattern $MK_{11}$ is arranged on a layer same as the layer where the first signal line 102 is, and is of the material same as that of the first signal line 102.

The second sub-alignment pattern $MK_{12}$ is arranged on a layer same as the layer where the second signal line 103 is, and is of the material same as that of the second signal line 103. The third sub-alignment pattern $MK_{13}$ is arranged on a layer same as a layer where the second interlayer dielectric layer 111 is, and is of the material same as that of the second interlayer dielectric layer 111.

In some embodiments, the first sub-alignment pattern $MK_{11}$ and the third sub-alignment pattern $MK_{13}$ can be used to realize the direct alignment of the second through hole $V_2$ penetrating through the second interlayer dielectric layer 111 and the first signal line 102, so as to ensure that the second through hole $V_2$ does not overlap on the first signal line 102. The second sub-alignment pattern $MK_{12}$ and the third sub-alignment pattern $MK_{13}$ are used to realize the direct alignment of the second through hole $V_2$ and the second signal line 103, so as to ensure that the second through hole $V_2$ does not overlap on the second signal line 103. Since direct alignment involves only one alignment, indirect alignment involves at least two direct alignments, the deviation of direct alignment is less than that of indirect alignment. In the present disclosure, the second through hole $V_2$ and the first signal line 102 and the second signal line 103 are directly aligned respectively, so as to ensure that the alignment deviation between the second through hole $V_2$ and the first signal line 102, and the alignment deviation between the second through hole $V_2$ and the second signal line 103 are smaller, so that the distance between the second through hole $V_2$ and the first signal line 102 and the distance between the second through hole $V_2$ and the second signal line 103 can be compressed to the process limit, then ensure that more space is available for arranging the pixel electrodes 104, which helps to increase the opening ratio.

It should be noted that in the present disclosure, "same layer, same material" refers to the layer structure formed by the same film-forming process to form a film layer for making a specific pattern, and then the same mask is used to form a layer structure through a one-time composition process. That is, one composition process corresponds to one mask (also known as a photo-mask). Depending on the particular pattern, one composition process may include multiple exposures, development, or etching, and the specific pattern in the layer structure may be continuous or discontinuous, and these specific patterns may be at the same height or have the same thickness, or may be at different heights or have different thicknesses.

Figure 22:
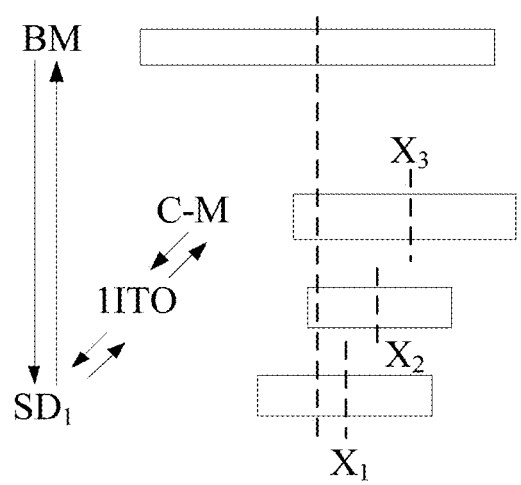
FIG. 22 is a schematic diagram of the alignment between the display substrate and the opposing substrate and the alignment between the parts of the film layer in the display substrate provided by an embodiment of the present disclosure.
Figure 23:
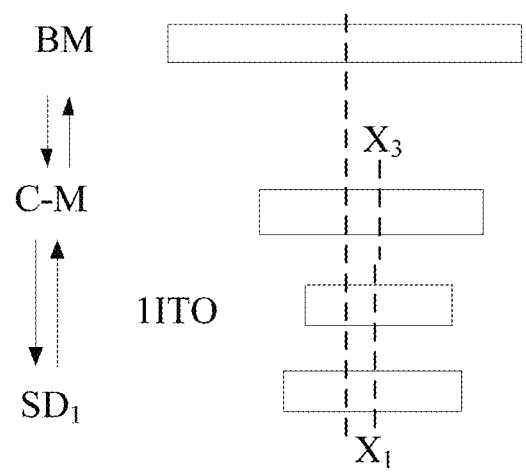
FIG. 23 is another schematic diagram of the alignment between the display substrate and the opposing substrate, and the alignment between the parts of the film layers in the display substrate provided by an embodiment of the present disclosure.

In some embodiments, as shown in FIG. 22, the layer C-M where the first light-shielding structure 105 is can be directly aligned with the layer 1ITO where the pixel electrode 104 is, and after the layer 1ITO where the pixel electrode 104 is located is directly aligned with the layer $SD_1$ where the second signal line 103 is located, the indirect alignment of the layer C-M where the first light-shielding structure 105 is located and the layer $SD_1$ where the second signal line 103 is located can be realized. However, in this case, the alignment deviation between the layer C-M where the first light-shielding structure 105 is located and the layer $SD_1$ where the second signal line 103 is located is larger, and the loss of the opening rate is larger. In FIG. 23, the layer C-M where the first light-shielding structure 105 is located is directly aligned with the layer $SD_1$ where the second signal line 103 is located, so that the alignment deviation between the layer C-M where the first light-shielding structure 105 is located and the layer $SD_1$ where the second signal line 103 is located is small, and is conducive to improving the opening rate.

Figure 24:
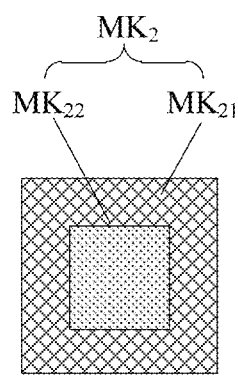
FIG. 24 is a structural schematic diagram of the second alignment identification provided by an embodiment of the present disclosure.

Based on this, in the motherboard provided in the embodiment of the present disclosure, a plurality of second alignment marks $MK_2$ as shown in FIG. 24 may also be arranged. In some embodiments, a plurality of second alignment marks $M_2$ may be in the bezel area BA of the display substrate 001 and/or at the gap GA between adjacent display substrates 001. Continuing with FIG. 24, it can be seen that the second alignment identification $MK_2$ includes a fourth sub-alignment pattern $MK_{21}$ and a fifth sub-alignment pattern $MK_{22}$. The orthographic projection of the fifth sub-parametric pattern $MK_{22}$ on the base substrate 101 is within the orthographic projection of the fourth sub-alignment pattern $MK_{21}$ on the base substrate 101. In some embodiments, the fourth sub-alignment pattern $MK_{21}$ is arranged on a layer same as the layer where the second signal line 103 is, and is of the material same as that of the second signal line 103. The fifth sub-alignment pattern $MK_{22}$ is arranged on a layer same as the layer where the first light-shielding structure 105 is, and is of the same material same as that of the first light-shielding structure 105, so that the fourth sub-alignment pattern $MK_{21}$ and the fifth sub-alignment pattern $MK_{22}$ can be used to realize the direct alignment of the second signal line 103 and the first light-shielding structure 105 and improve the opening rate.

In some embodiments, in the motherboard provided in the present embodiments, it can be seen from FIG. 2 and FIG. 4 the insulating layers on a side facing the layer where the first light-shielding structure 105 is, of the layer where the second signal line 103 is, include the second interlayer dielectric layer 111, the planarization layer 107 and the passivation layer 114 in turn. In some embodiments, the planarization layer 107 between the fourth sub-alignment pattern $MK_{21}$ and the fifth sub-alignment pattern $MK_{22}$ can be removed, so that only the second interlayer dielectric layer 111 and the passivation layer 114 are arranged between the fourth sub-alignment pattern $MK_{21}$ and the fifth sub-alignment pattern $MK_{22}$, so as to ensure the grasping accuracy of the fourth sub-alignment pattern $MK_{21}$ and the fifth sub-alignment pattern $MK_{22}$ by the alignment equipment.

The motherboard alignment is to laminate the display substrate 001 and the opposing substrate 002 together under vacuum conditions to form a complete optical system. The accuracy of the alignment directly affects the stability of the product's opening rate and transmittance.

The actual shading layer on the display substrate 001 in the disclosure is the first light-shielding structure 105. In some embodiments, as shown in FIG. 22, through a direct alignment of the layer $SD_1$ where the second signal line 103 is located, and the first black matrix $BM_1$ (belonging to the black matrix BM), and then through the direct alignment of the layer $SD_1$ where the second signal line 103 is located and the layer 1ITO where the pixel electrode 104 is located, and the direct alignment of the layer 1ITO where the pixel electrode 104 is located and the layer where the first light-shielding structure 105 is located, the indirect alignment between the first light-shielding structure 105 and the first black matrix $BM_1$ can be realized. In FIG. 22, $X_1$ represents the alignment deviation between the second signal line 103 and the first black matrix $BM_1$, $X_2$ represents the alignment deviation between the pixel electrode 104 and the first black matrix $BM_1$, and $X_3$ represents the alignment deviation between the first light-shielding structure 105 and the first black matrix $BM_1$. As shown in FIG. 20, this indirect alignment mode leads to a large alignment deviation $X_3$ between the first light-shielding structure 105 and the first black matrix $BM_1$, and the two cannot effectively overlap, thereby affecting the stability of the opening ratio. However, in FIG. 23, the layer C-M where the first light-shielding structure 105 is located is directly aligned with the first black matrix $BM_1$ (belonging to the black matrix BM), the layer C-M where the first light-shielding structure 105 is located is directly aligned with the second signal line 103, the alignment deviation $X_3$ between the first light-shielding structure 105 and the first black matrix $BM_1$, and the alignment deviation $X_1$ between the second signal line 103 and the first black matrix $BM_1$ are all smaller. Therefore, in the present disclosure, the direct alignment mode of the first light-shielding structure 105 and the first black matrix $BM_1$ shown in FIG. 23 can be adopted, so that the alignment deviation between the two is smaller, and the influence on the opening rate is also smaller.

Figure 25:
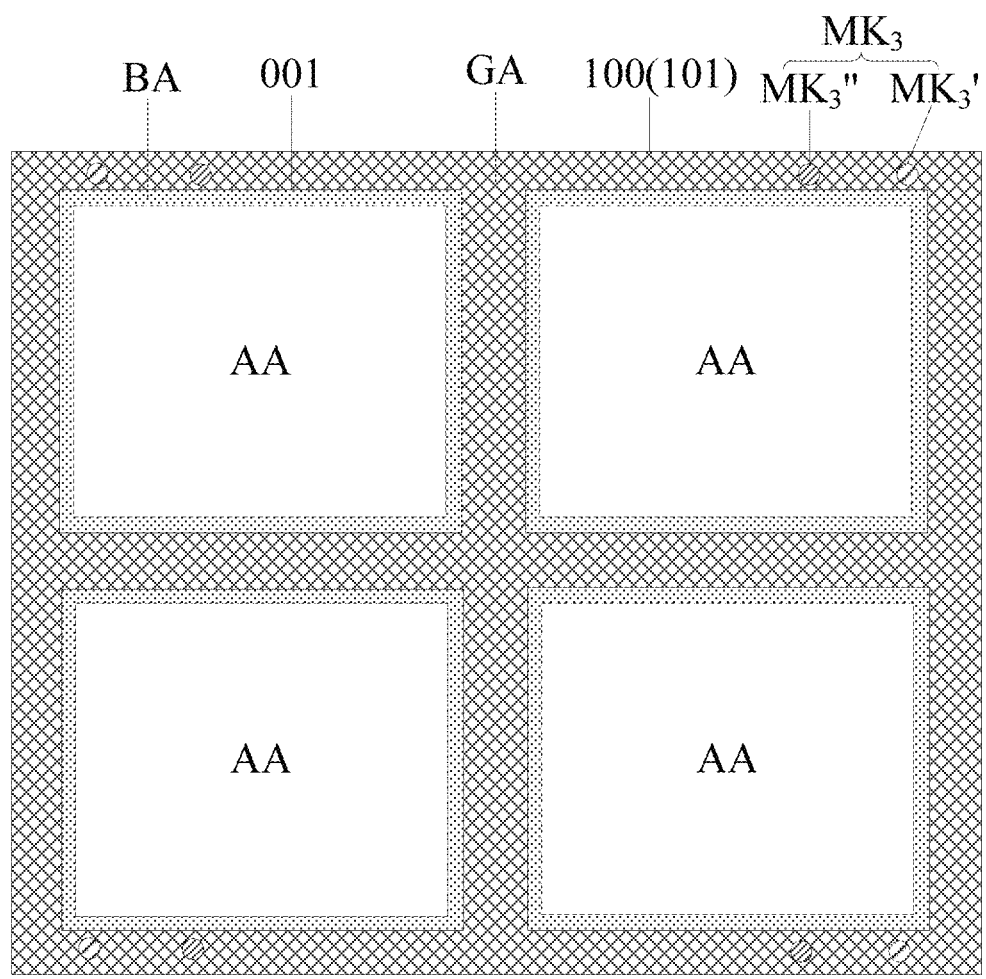
FIG. 25 is another structural schematic diagram of the motherboard provided by an embodiment of the present disclosure.
Figure 26:
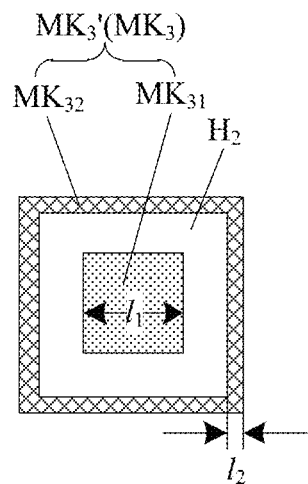
FIG. 26 is a structural schematic diagram of the third alignment identification provided by an embodiment of the present disclosure.
Figure 27:
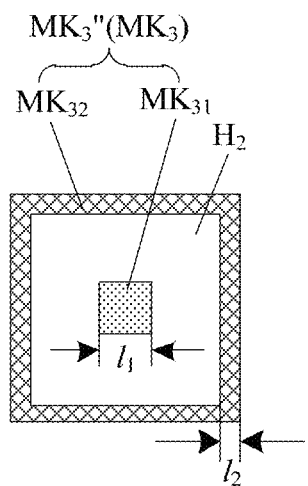
FIG. 27 is another structural schematic diagram of the third alignment identification provided by an embodiment of the present disclosure.

Based on this, the motherboard provided in the embodiment of the present disclosure, may further include a plurality of opposing substrates 002 opposite to the display substrates 001. The second base substrates 201 of the opposing substrates 002 are integrally arranged. Each opposing substrate 002 includes a black matrix BM. As shown in FIG. 25 to FIG. 27, the motherboard is provided with a plurality of third alignment marks $MK_3$. Each third alignment mark $MK_3$ includes a sixth sub-alignment pattern $MK_{31}$ which is on a layer same as the layer where the black matrix BM is, and is of the material same as that of the black matrix BM, and a seventh sub-alignment pattern $MK_{32}$ which is on a layer same as the layer where the first light-shielding structure 105 is, and is of the material same as that of the first light-shielding structure 105. The seventh sub-alignment pattern $MK_{32}$ includes a second hollow structure $H_2$. The orthographic projection of the sixth sub-alignment pattern $MK_{31}$ on the base substrate 100 is within the orthographic projection of the second hollow structure $H_2$ on the base substrate 100. The arrange of the second hollow structure $H_2$ is convenient for grabbing the boundary of the seventh sub-alignment pattern $MK_{32}$ and the boundary of the sixth sub-alignment pattern $MK_{31}$, so as to improve the alignment accuracy. Moreover, through the sixth sub-alignment pattern $MK_{31}$ and the seventh sub-alignment pattern $MK_{32}$, the direct alignment of the first black matrix $BM_1$ included in the black matrix BM and the first light-shielding structure 105 can be realized.

In some embodiments, a plurality of third alignment marks $MK_3$ may be in the bezel area of the opposing substrate 002 and/or at the gap between the adjacent opposing substrates 002. In some embodiments, the bezel area of the opposing substrate 002 and the bezel area BA of the display substrate 001 are correspondingly arranged, and the gap between the adjacent opposing substrates 002 and the gap GA between the adjacent display substrates 001 is correspondingly arranged. For example, as shown in FIG. 25, the third alignment mark $MK_3$ is at the gap between adjacent opposing substrates 002 (corresponding to the gap GA between adjacent display substrates 001). In some embodiments, the third alignment mark $MK_3$ may include the third alignment mark $MK_3'$ for fine alignment as shown in FIG. 26 and the third alignment mark $MK_3''$ for rough alignment as shown in FIG. 27. The difference between the two kinds of third alignment marks $MK_3$ is that the third alignment mark $MK_3'$ for fine alignment is smaller in size than the third alignment mark $MK_3''$ for rough alignment. For example, the side length $I_1$ of the sixth sub-alignment pattern $MK_{31}$ in the third alignment mark $MK_3'$ for fine alignment is ½ of that of the sixth sub-alignment pattern $MK_{31}$ in the third alignment mark $MK_3''$ for rough alignment, and the solid width 12 of the seventh sub-alignment pattern $MK_{32}$ in the third alignment mark $MK_3'$ for fine alignment is ⅗ of that of the seventh sub-alignment pattern $MK_{32}$ in the third alignment mark $MK_3'$ for rough alignment.

In some embodiments, in the motherboard provided in the present embodiment, a plurality of fourth alignment marks (TP mark) may also be arranged. The fourth alignment marks are roughly evenly distributed at the gap GA between the display substrates 001. The fourth alignment marks are arranged on a layer same as the layer where the first light-shielding structure 105 is and of the material same as that of the first light-shielding structure 105. The fourth alignment marks are configured to measure the deviation of the actual position of the seventh sub-alignment pattern $M_{32}$ relative to the preset position, so as to adjust the position of the sixth sub-alignment pattern $M_{31}$ on the opposing substrate 002 according to the deviation adaptably. For example, if the actual position of the seventh sub-alignment pattern $M_{32}$ is measured to be deviated to the left by the fourth alignment marks by 1 μm relative to the preset position, the position of the sixth sub-alignment pattern $M_{31}$ on the opposing substrate 002 needs to be adaptably adjusted to the left by 1 μm, so that the relative positions of the sixth sub-alignment pattern $M_{31}$ and the seventh sub-alignment pattern $M_{32}$ remain unchanged. Finally, the accurate alignment of the first black matrix $BM_1$ and the first light-shielding structure 105 is realized by the sixth sub-alignment pattern $M_{31}$ and the seventh sub-alignment pattern $M_{32}$.

Although the preferred embodiments have been described in the present disclosure, it should be understood that those skilled in the art may make various changes and variants to the embodiments of the present disclosure without departing from the spirit and scope of the embodiments of the present disclosure. Thus, if these modifications and variants of the embodiment of the present disclosure fall within the scope of the claims of the present disclosure and their equivalents, the present disclosure is also intended to include such modifications and variants.

What is claimed is:

1. A display substrate comprising:
   a first base substrate;
   a plurality of first signal lines on a side of the first base substrate, wherein the plurality of first signal lines extend along a first direction and are arranged along a second direction, and the first direction and the second direction intersect with each other;
   a plurality of second signal lines on the same side of the first base substrate as the plurality of first signal lines, wherein the plurality of second signal lines and the plurality of first signal lines are arranged in different layers, and the plurality of second signal lines extend along the second direction and are arranged along the first direction;
   a plurality of pixel electrodes on a side, facing away from the first base substrate, of layers where the plurality of first signal lines and the plurality of second signal lines are located, wherein orthographic projections of the plurality of pixel electrodes on the first base substrate are within areas defined by intersections of orthographic projections of the plurality of first signal lines on the first base substrate and orthotropic projections of the plurality of second signal lines on the first base substrate;
   a plurality of first light-shielding structures on a side, facing away from the first base substrate, of a layer where the plurality of pixel electrodes are located, wherein the plurality of first light-shielding structures extend along the second direction and are arranged along the first direction, orthographic projections of the plurality of first light-shielding structures on the first base substrate are within orthographic projection of a gaps between columns of pixel electrodes extending in the second direction on the first base substrate, the orthographic projections of the plurality of first light-shielding structures on the first base substrate and the orthographic projections of the plurality of second signal lines on the first base substrate have areas that do not overlap with each other.

2. The display substrate of claim 1, wherein the orthographic projections of the plurality of second signal lines on the first base substrate are within the orthographic projections of the plurality of first light-shielding structures on the first base substrate.

3. The display substrate of claim 1, further comprising a plurality of second light-shielding structures arranged between the layers where the plurality of first signal lines and the plurality of second signal lines are located and the first base substrate;

wherein the plurality of second light-shielding structures extend along the first direction and are arranged along the second direction; and the orthographic projections of the plurality of first signal lines on the first base substrate is within orthographic projections of the plurality of second light-shielding structures on the first base substrate.

4. The display substrate of claim 3, wherein an orthographic projection of one first signal line on the first base substrate is on a side of an orthographic projection of a symmetry axis extending along the first direction of one second light-shielding structure;

on the same side of the symmetry axis extending along the first direction of the one second light-shielding structure, a distance by which the orthographic projection of the plurality of second light-shielding structures on the first base substrate extends outward relative to the orthographic projection of the plurality of first signal lines on the first base substrate is greater than 0 μm and less than or equal to 0.4 μm.

5. The display substrate of claim 3, further comprising a plurality of transistors between the first base substrate and the layer where the plurality of pixel electrodes are located, and a planarization layer between the layer where the plurality of transistors are located and the layer where the plurality of pixel electrodes are located; wherein a first electrode of each transistor is electrically connected with each pixel electrode by means of a first through hole penetrating through the planarization layer;

an orthographic projection of the first through hole on the first base substrate is within the orthographic projections of the plurality of second light-shielding structures on the first base substrate.

6. The display substrate of claim 5, wherein an orthographic projection of a symmetry axis extending along the first direction, of the plurality of second light-shielding structures on the first base substrate roughly coincides with an orthographic projection of a symmetry axis extending along the first direction, of the first through hole on the first base substrate.

7. The display substrate of claim 6, wherein, on the same side of the symmetry axis extending along the first direction, of the plurality of second light-shielding structures, and in a direction where the plurality of second light-shielding structures is facing away from the first base substrate, an aperture of the first through hole gradually increases; and the orthographic projection of the plurality of second light-shielding structures on the first base substrate extends outward by a distance greater than or equal to 0.8 μm and less than or equal to 1.0 μm relative to an orthographic projection of a maximum aperture of the first through hole on the first base substrate.

8. The display substrate of claim 5, further comprising a gate insulating layer, a first interlayer dielectric layer and a second interlayer dielectric layer which are between the layer where the first electrode of each transistor is located and the layer where an active layer of each transistor is located;

wherein the first electrode of each transistor is electrically connected with the active layer of each transistor by means of a second through hole penetrating through the second interlayer dielectric layer, the first interlayer dielectric layer and the gate insulating layer; and an orthographic projection of the second through hole on the first base substrate is within an orthographic projection of one second light-shielding structure on the first base substrate.

9. The display substrate of claim 8, wherein the orthographic projection of the first signal line on the first base substrate and the orthographic projection of the second through hole on the first base substrate are respectively on both sides of the symmetry axis extending along the first direction, of the second light-shielding structure;

in a direction that the plurality of second light-shielding structures are facing away from the first base substrate, an aperture of the second through hole gradually increases;

in the second direction, a distance between the orthographic projection of the first signal line on the first base substrate and an orthographic projection of a maximum aperture of the second through hole on the first base substrate is approximately equal to a+$\sqrt{2b^2+c^2}$, wherein a is a length of a light doping region of the active layer in each transistor in the second direction, b is ½ of a process fluctuation value of the first signal line and the second through hole, and c is an alignment deviation of the first signal line and the second through hole.

10. The display substrate of claim 9, wherein on the same side of the symmetry axis extending along the first direction, of the second light-shielding structure, a distance by which the orthographic projection of the plurality of second light-shielding structures on the first base substrate extends outward relative to an orthographic projection of a maximum aperture of the second through hole is greater than or equal to 0.5 μm and less than 0.9 μm.

11. The display substrate of claim 5, wherein an orthographic projection of the first electrode of each transistor on the first base substrate is within the orthographic projection of the plurality of second light-shielding structures on the first base substrate.

12. The display substrate of claim 1, further comprising a common electrode on a side, facing away from the first base substrate, of the layer where the plurality of pixel electrodes are located, wherein the plurality of first light-shielding structures are in contact with the common electrode.

13. The display substrate of claim 12, wherein the plurality of first light-shielding structures are on a side facing the first base substrate, of the common electrode; the orthographic projection of the plurality of first light-shielding structures on the first base substrate is within the orthographic projection of the common electrode on the first base substrate, and the common electrode cover a lateral surface of the plurality of first light-shielding structures; or the plurality of first light-shielding structures are on a side facing away from the first base substrate, of the common electrode; at gaps between columns of pixel electrodes extending in the second direction, the orthographic projection of the plurality of first light-shielding structures on the first base substrate roughly coincides with the orthographic projection of the common electrode on the first base substrate.

14. The display substrate of claim 13, wherein the common electrode comprises a plurality of slits extending along the second direction, each pixel electrode is correspondingly arranged with at least one slit, and orthotropic projections of the plurality of slits on the first base substrate and the orthotropic projections of the plurality of first light-shielding structures on the first base substrate do not overlap with each other.

15. A display device, comprising a display substrate and an opposing substrate placed oppositely, and a liquid crystal layer arranged between the display substrate and the opposing substrate, wherein the display substrate is the display substrate as claimed in claim 1.

16. The display device of claim 15, wherein the opposing substrate comprises a black matrix, the black matrix comprises a plurality of first black matrices extending in the second direction and arranged in the first direction, and the orthographic projections of the plurality of first light-shielding structures on the first base substrate are within orthographic projections of the plurality of first black matrixes on the first base substrate; or wherein the opposing substrate comprises a black matrix, the black matrix comprises a plurality of second black matrices extending in the first direction and arranged in the second direction, and orthographic projections of the plurality of second black matrixes on the first base substrate are within the orthographic projections of the plurality of second light-shielding structures on the first base substrate; in a direction that the plurality of second light-shielding structures are facing away from the first base substrate, an aperture of the first through hole penetrating through the planarization layer gradually increases, and a width of each second black matrix in the second direction is greater than or equal to a minimum aperture of the first through hole in the second direction and less than a maximum aperture of the first through hole in the second direction.

17. The display device of claim 16, wherein an orthographic projection of a symmetry axis extending along the first direction, of the plurality of second black matrixes on the first base substrate and an orthographic projection of a symmetry axis extending along the first direction of, the plurality of second light-shielding structures on the first base substrate roughly coincides.

18. A motherboard, comprising a plurality of display substrates as claimed in claim 1, wherein the first base substrate of each display substrate forms a base substrate of an integrated structure.

19. The motherboard of claim 18, wherein each display substrate comprises a display area and a bezel area on at least one side of the display area; the motherboard further comprises a plurality of first alignment marks, wherein the plurality of first alignment marks are in the bezel area and/or at gaps between adjacent display substrates;

each first alignment mark comprises a first sub-alignment pattern arranged in a same layer and material as the plurality of first signal lines, a second sub-alignment pattern arranged in a same layer and material as the plurality of second signal lines, and a third sub-alignment pattern arranged in a same layer and material as the second interlayer dielectric layer;

wherein the first sub-alignment pattern comprises a first hollow structure, and an orthographic projection of the second sub-alignment pattern on the base substrate is within an orthographic projection of the first hollow structure on the base substrate, an orthographic projection of the third sub-alignment pattern on the base substrate is within the orthographic projection of the second sub-alignment pattern on the base substrate;

wherein the motherboard further comprises a plurality of second alignment marks, wherein the plurality of second alignment marks are in the bezel area, and/or at the gaps of between adjacent display substrates;

each second alignment mark comprises a fourth sub-alignment pattern arranged in a same layer and material as the plurality of second signal lines, and a fifth sub-alignment pattern arranged in a same layer and material as the plurality of first light-shielding structures; wherein an orthographic projection of the fifth sub-alignment pattern on the base substrate is within an orthographic projection of the fourth sub-alignment pattern on the base substrate;

wherein insulating layers on a side facing the layer where the plurality of first light-shielding structures are located, of the layer where the plurality of second signal lines are locate, are successively arranged as: a second interlayer dielectric layer, a planarization layer and a passivation layer; the passivation layer and the second interlayer dielectric layer are merely arranged between the fourth sub-alignment pattern and the fifth sub-alignment pattern.

20. The motherboard of claim 19, further comprising a plurality of opposing substrates placed opposite to the plurality of display substrates, wherein second base substrates of the plurality of opposing substrates are integrally arranged, and each opposing substrate comprises a black matrix;

the motherboard further comprises a plurality of third alignment marks, wherein the plurality of third alignment marks are in the bezel area and/or at gaps between adjacent opposing substrates;

each third counterpoint marker comprises a sixth sub-alignment pattern arranged in a same layer and material as the black matrix, and a seventh sub-alignment pattern arranged in a same layer and material as the plurality of first light-shielding structures;

the seventh sub-alignment pattern comprises a second hollow structure, and an orthographic projection of the sixth sub-alignment pattern on the base substrate is within an orthographic projection of the second hollow structure on the base substrate;

wherein the motherboard further comprises a plurality of fourth alignment marks, wherein the plurality of fourth alignment marks are roughly evenly distributed at the gaps between the display substrates, the plurality of fourth alignment marks are arranged in a same layer and material as the plurality of first light-shielding structures, and the fourth alignment marks are configured to measure a deviation of an actual position of the seventh sub-alignment pattern from a preset position.

* * * * *